(12) United States Patent
Chun et al.

(10) Patent No.: US 11,521,606 B2
(45) Date of Patent: Dec. 6, 2022

(54) REFRIGERATOR AND INFORMATION DISPLAY METHOD THEREOF

(71) Applicant: Samsung Electronics Co., Ltd., Suwon-si (KR)

(72) Inventors: Eun Jin Chun, Suwon-si (KR); Young Soo Do, Yongin-si (KR); Hyoung Jin Lee, Suwon-si (KR); Nam Gook Cho, Suwon-si (KR); Do Hyeong Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 685 days.

(21) Appl. No.: 16/476,008

(22) PCT Filed: Dec. 27, 2017

(86) PCT No.: PCT/KR2017/015548
§ 371 (c)(1),
(2) Date: Jul. 3, 2019

(87) PCT Pub. No.: WO2018/128317
PCT Pub. Date: Jul. 12, 2018

(65) Prior Publication Data
US 2019/0348044 A1 Nov. 14, 2019

(30) Foreign Application Priority Data

Jan. 3, 2017 (KR) .................. 10-2017-0000880
Dec. 26, 2017 (KR) .................. 10-2017-0179174

(51) Int. Cl.
*G10L 15/22* (2006.01)
*F25D 29/00* (2006.01)
(Continued)

(52) U.S. Cl.
CPC ............ *G10L 15/22* (2013.01); *F25D 29/005* (2013.01); *G06F 21/32* (2013.01); *G06N 3/004* (2013.01);
(Continued)

(58) Field of Classification Search
None
See application file for complete search history.

(56) References Cited

U.S. PATENT DOCUMENTS 8,744,859 B2 * 6/2014 Yang .................. G10L 15/26
704/270.1
9,355,639 B2 * 5/2016 Otani .................. G10L 15/22
(Continued)

FOREIGN PATENT DOCUMENTS

| CN | 203249464 U | 10/2013 |
| CN | 104990359 A | 10/2015 |

(Continued)

OTHER PUBLICATIONS

Laubheimer, "Cards: UI-Component Definition", Nielsen Norman Group, Nov. 6, 2016, www.nngroup.com/articles/cards-component/#:~:text=Summary%3A%20A%20%E2%80%9Ccard%E2%80%9D%20is,visually%20resembling%20a%20playing%20card. (Year: 2016).*

(Continued)

*Primary Examiner* — Brian L Albertalli

(57) ABSTRACT

A refrigerator comprises a storage compartment configured to store food, a temperature detector configured to detect an internal temperature of the storage compartment, a cooler configured to supply cool air to the storage compartment, a microphone configured to receive a speech, a display configured to display information, at least one processor configured to be electrically connected to the temperature detector, the microphone, and the display; and a memory (Continued)

configured to be electrically connected to the at least one processor. The memory stores at least one instructions configured to, when a first speech including a food name is recognized via the microphone, allow the processor to display a food list, which comprises food information corresponding to the food name and an identification mark identifying the food information, on the display, and configured to, when a second speech referring to the identification mark is recognized via the microphone, allow the processor to display food purchase information corresponding to the identification mark, on the display.

8 Claims, 28 Drawing Sheets

(51) Int. Cl.
    *G06F 21/32*     (2013.01)
    *G06N 3/00*     (2006.01)
    *G10L 15/28*     (2013.01)

(52) U.S. Cl.
    CPC ...... *G10L 15/285* (2013.01); *F25D 2400/361* (2013.01); *F25D 2500/06* (2013.01); *F25D 2600/06* (2013.01); *F25D 2700/12* (2013.01); *G10L 2015/223* (2013.01)

(56) References Cited

U.S. PATENT DOCUMENTS

| | | | |
|---|---|---|---|
| 2003/0014259 A1* | 1/2003 | Ferragut, II | G09F 27/00 704/E13.008 |
| 2004/0117274 A1* | 6/2004 | Cenedese | F25D 29/00 705/28 |
| 2007/0082706 A1* | 4/2007 | Campbell | G10L 15/22 704/E15.04 |
| 2007/0180384 A1* | 8/2007 | Aiello | G01C 21/36 704/E15.04 |
| 2007/0294081 A1* | 12/2007 | Wang | G10L 15/26 704/200 |
| 2008/0059195 A1* | 3/2008 | Brown | 704/270 |
| 2010/0049619 A1 | 2/2010 | Beck | |
| 2010/0211390 A1* | 8/2010 | Hillebrecht | G10L 15/08 704/E15.005 |
| 2011/0210822 A1* | 9/2011 | Lee | F25D 29/00 704/E15.005 |
| 2013/0191243 A1* | 7/2013 | Jung | G06Q 30/0633 705/26.8 |
| 2014/0052573 A1* | 2/2014 | Oh | G06Q 10/10 705/26.8 |
| 2014/0169640 A1 | 6/2014 | Park et al. | |
| 2014/0195383 A1* | 7/2014 | Kim | G06Q 30/0633 705/26.8 |
| 2014/0358287 A1 | 12/2014 | Lee et al. | |
| 2015/0120294 A1* | 4/2015 | Gardner | G10L 15/22 704/235 |
| 2015/0248886 A1* | 9/2015 | Sarikaya | G06F 16/3329 704/257 |
| 2015/0294451 A1* | 10/2015 | Lee | G06T 7/0004 382/110 |
| 2015/0302857 A1 | 10/2015 | Kamada | |
| 2016/0138858 A1* | 5/2016 | Lu | F25D 29/00 704/275 |
| 2016/0162715 A1* | 6/2016 | Luk | F25D 29/00 235/385 |
| 2016/0180853 A1* | 6/2016 | VanLund | G10L 17/22 704/275 |
| 2016/0248768 A1* | 8/2016 | McLaren | H04L 63/102 |
| 2017/0039511 A1* | 2/2017 | Corona | G06Q 10/087 |
| 2017/0293966 A1* | 10/2017 | Huang | G06Q 30/0641 |
| 2018/0120019 A1* | 5/2018 | Kim | F25D 29/005 |
| 2020/0348077 A1* | 11/2020 | Lee | F25D 29/00 |

FOREIGN PATENT DOCUMENTS

| | | |
|---|---|---|
| CN | 204987636 U | 1/2016 |
| EP | 2662651 A2 | 11/2013 |
| JP | 2002-115956 A | 4/2002 |
| KR | 10-2008-0105933 A | 12/2008 |
| KR | 10-0885584 B1 | 2/2009 |
| KR | 10-2012-0118376 A | 10/2012 |
| KR | 20120118376 A | 10/2012 |
| KR | 10-2014-0139736 A | 12/2014 |
| WO | 2008010688 A1 | 1/2008 |

OTHER PUBLICATIONS

"Cards—Material Design", Material Design, material.io/components/cards. Accessed Feb. 9, 2022. (Year: 2022).*
Supplementary European Search Report in connection with European Application No. 17890733.3 dated Oct. 28, 2019, 7 pages.
ISA/KR, "International Search Report and Written Opinion of the International Search Authority," Application No. PCT/KR2017/015548, dated Apr. 24, 2018, 16 pages.
The Second Office Action dated Oct. 21, 2021, in connection with Chinese Application No. 201780082150.3, 16 pages.
Communication pursuant to Article 94(3) EPC dated Nov. 30, 2021, in connection with European Application No. 17890733.3, 6 pages.
First Office Action dated Dec. 3, 2020 in connection with Chinese Application No. 201780082150.3, 17 pages.
Notice of Preliminary Rejection dated Feb. 17, 2022, in connection with Korean Application No. 10-2017-0179174, 16 pages.
Notice of Patent Allowance dated May 11, 2022, in connection with Korean Application No. 10-2017-0179174, 3 pages.
Rejection Decision dated May 7, 2022, in connection with Chinese Application No. 201780082150.3, 13 pages.

* cited by examiner

REFRIGERATOR AND INFORMATION DISPLAY METHOD THEREOF

CROSS-REFERENCE TO RELATED APPLICATIONS

This application is a 371 National Stage of International Application No. PCT/KR2017/015548, filed Dec. 27, 2017, which claims priority to Korean Patent Application No. 10-2017-0000880, filed Jan. 3, 2017, and Korean Patent Application No. 10-2017-0179174, filed Dec. 26, 2017, the disclosures of which are herein incorporated by reference in their entirety.

1. FIELD

The present disclosure relates to a refrigerator and an information display method thereof, more particularly, to a refrigerator capable of communicating with an external device and an information display method thereof.

In addition, the present disclosure relates to an artificial intelligence (AI) system capable of mimicking functions of the human brain such as recognition and determination, by using a machine learning algorithm, and an application thereof.

2. DESCRIPTION OF RELATED ART

Recently, refrigerators have been equipped with a display to display a temperature of a storage compartment and an operating mode of the refrigerator.

Such a display not only enables a user to easily acquire image information using a graphic user interface, but also enables a user to intuitively input control commands using a touch panel. In other words, the new display is capable of receiving information as well as capable of displaying information.

In addition, the new refrigerator includes a communication module for connecting to an external device (for example, a server connected to Internet).

Refrigerators may be connected to Internet through a communication module, acquire a variety of information from different servers and provide a variety of services based on the acquired information. For example, through Internet, refrigerators may provide a variety of services such as Internet shopping as well as providing information related to foods such as information of food and recipes of food.

As such, the refrigerator provides a variety of services to users through its display and communication modules.

In addition, recently, an artificial intelligence (AI) technology has proliferated, and the AI technology is a system that a machine learns and determines itself and becomes intelligent unlike rule-based smart system. The AI system is a computer system that implements human-level intelligence and that a machine learns, determines, and becomes intelligent by itself unlike rule-based smart systems. As the AI system is used, a recognition rate is more increased and user preferences are more accurately understood. Therefore, rule-based smart systems are gradually being replaced by deep-learning based AI systems.

AI technology includes a machine learning (e.g., deep learning) and element technologies that utilize the machine learning. The machine learning is an algorithm technology for autonomously categorizing and learning characteristics of input data. Element technologies are technologies that utilize the machine learning and may include linguistic understanding, visual understanding, reasoning/prediction, knowledge representation, and motion control.

Various fields in which the AI technology is applied are as follows. Linguistic understanding is a technology for recognizing, applying/processing human languages/characters and includes natural language processing, machine translation, dialogue system, query response, speech recognition/synthesis, etc. Visual understanding is a technology for recognizing and processing objects in a manner similar to that of human vision and includes object recognition, object tracking, image searching, human recognition, scene understanding, space understanding, and image enhancement. Reasoning/prediction is a technology to determine information for logical reasoning and prediction and includes knowledge/probability-based reasoning, optimization prediction, preference-based planning, and recommendation. Knowledge representation is a technology for automating human experience information into knowledge data and includes knowledge building (data generation/categorization) and knowledge management (data utilization). Motion control is a technology for controlling autonomous driving of a vehicle and a motion of a robot and includes motion control (navigation, collision avoidance, driving), manipulation control (behavior control), etc.

SUMMARY

The present disclosure is directed to providing a refrigerator capable of receiving a command in a speech by using a speech recognition technology and capable of outputting a content in a speech.

Further, the present disclosure is directed to providing a refrigerator capable of providing Internet shopping based on a command in a speech.

Further, the present disclosure is directed to providing a refrigerator capable of identifying a plurality of users and providing a content appropriate for the identified user.

One aspect of the present disclosure provides a refrigerator including a microphone, a display configured to display information according to a speech input via the microphone, and a controller configured to, when a first speech including a food name is recognized, display a list including information on a food having a name corresponding to the food name and an identification mark identifying the food, on the display and configured to, when a second speech referring to at least one marks among the marks, display food information indicated by the mark contained in the second speech, on the display.

When the first speech is recognized, the controller may overlap the list in a card type user interface, with a user interface of an application displayed on the display.

When the second speech is recognized, the controller may execute an application providing information of food indicated by a mark contained in the second speech so as to display food information, which is provided from the application, on the display.

The refrigerator may further include a communication circuitry, and when the first speech is recognized, the controller may transmit data of the first speech to a server via the communication circuitry, and when the communication circuitry receives information on the list transmitted from the server, the controller may display the list on the display.

The refrigerator may further include a communication circuitry, and when the second speech is recognized, the controller may transmit data of the second speech to a server via the communication circuitry, and when the communication circuitry receives food information transmitted from the server, the controller may display the food information on the display.

The refrigerator may further include a communication circuitry, and when the first speech is recognized, the controller may transmit data of the first speech to a server via the communication circuitry, and when the communication circuitry receives analysis information on the first speech transmitted from the server, the controller may transmit a command according to the analysis information to an application, which is related to performance of an operation according to the analysis information, so as to allow the application to display the list.

The refrigerator may further include a communication circuitry, and when the second speech is recognized, the controller may transmit data of the second speech to a server via the communication circuitry, and when the communication circuitry receives analysis information on the second speech transmitted from the server, the controller may transmit a command according to the analysis information to an application, which is related to performance of an operation according to the analysis information, so as to allow the application to display the food information.

The refrigerator may further include a speaker configured to, when the list is displayed on the display due to the recognition of the first speech, output a speech indicating that the list is displayed, and configured to, when the food information is displayed on the display due to the recognition of the second speech, output a speech indicating that the food information is displayed.

Another aspect of the present disclosure provides a refrigerator including a microphone, a display configured to display information according to a speech input via the microphone, a speaker configured to output a speech, and a controller configured to, when a speech is input via the microphone, execute a command indicated by the input speech, on an application displayed on the display, and configured to, when the controller is not able to execute the command indicated by the input speech, on the application, execute the command on other application according to a priority that is pre-determined about applications related to the command.

When the controller is not able to execute the command indicated by the input speech, on the application, the controller may output a speech indicating that it is impossible to execute the command on the application, via the speaker.

When the priority is not present, the controller may output a speech requesting confirmation of whether to execute the command on other application, via the speaker.

When an answer to the request of the confirmation is input, the controller may execute a command indicated by the speech on an application indicated by the input answer.

When the controller is not able to execute the command indicated by the input speech, on the application, the controller may select an application, in which the command is to be executed, according to the priority that is pre-determined about applications related to the command, and execute the command on the selected application.

When a target, in which the command indicated by the speech is to be executed, is not contained in the speech input via the microphone, the controller may execute the command indicated by the input speech, on the application displayed on the display.

Another aspect of the present disclosure provides a refrigerator including a microphone, a display configured to display information according to a speech input via the microphone, a speaker configured to output a speech, and a controller configured to, when a speech is input via the microphone and it is needed to identify a user for executing a command indicated by the speech, display a pre-registered user on the display, and configured to output a speech requesting of selecting a user among the displayed users, via the speaker.

When a speech selecting at least one user among the displayed users is input, the controller may execute the command indicated by the speech, according to the selected user, and display a result thereof on the display.

When it is needed to identify a user for executing a command indicated by the speech, the controller may display the pre-registered user and a mark identifying each user on the display.

When a speech selecting at least one mark among the marks is input, the controller may execute a command indicated by the speech, according to a user indicated by the mark, and display a result thereof on the display.

When a speech is input via the microphone and an expression indicating a user is contained in the speech, the controller may execute a command indicated by the speech, according to a user contained in the speech, and display a result thereof on the display.

When a speech is input via the microphone, the controller may execute a command indicated by the speech, according to a user indicated by speech data matching with the input speech among pre-stored speech data, and display a result thereof on the display.

An aspect of the present disclosure may provide a refrigerator that receives a command in a speech by using a speech recognition technology and is capable of outputting a content in a speech.

An aspect of the present disclosure may provide a refrigerator that provides Internet shopping based on a command through a speech.

An aspect of the present disclosure may provide a refrigerator that identifies a plurality of users and providing a content appropriate for the identified user.

Another aspect of the present disclosure provides a refrigerator including a storage compartment configured to store food, a temperature detector configured to detect an internal temperature of the storage compartment, a cooler configured to supply cool air to the storage compartment, a microphone configured to receive a speech, a display configured to display information, at least one processor configured to be electrically connected to the temperature detector, the microphone, and the display; and a memory configured to be electrically connected to the at least one processor.

The memory may store at least one instructions configured to, when a first speech including a food name is recognized via the microphone, allow the processor to display a food list, which includes food information corresponding to the food name and an identification mark identifying the food information, on the display, and configured to, when a second speech referring to the identification mark is recognized via the microphone, allow the processor to display food at least one piece of purchase information corresponding to the identification mark, on the display.

The memory may store at least one instructions configured to, when the first speech including the food name is input via the microphone, allow the processor to acquire the food name by recognizing the first speech using a learning network model, which is trained using an artificial intelligence algorithm, and configured to allow the processor to display the food list including the food information corresponding to the food name, on the display. The learning network model may be trained by using a plurality of speeches and a plurality of words corresponding to the plurality of speeches.

The memory may store at least one instructions configured to, when the first speech including the food name is input via the microphone, allow the processor to acquire the food name and information of user uttering the first speech by recognizing the first speech using a learning network model, which is trained using an artificial intelligence algorithm, and configured to allow the processor to display the food list including the food information, which corresponds to the food name and is related to the user information, on the display. The learning network model may be trained by using a plurality of speeches and a plurality of pieces of user information corresponding to the plurality of speeches.

The memory may store at least one instructions configured to, when the first speech is recognized, allow the processor to identify whether a food related to the food name is placed in the storage compartment, and configured to, when the food is placed in the storage compartment, allow the processor to display information indicating that the food is placed in the storage compartment, on the display.

The memory may store at least one instructions configured to, when the first speech is recognized, allow the processor to identify whether a food related to the food name is placed in the storage compartment, and configured to, when the food is not placed in the storage compartment, allow the processor to display the food list including the food information corresponding to the food name, on the display.

The memory may store at least one instructions configured to, when the first speech is recognized, allow the processor to overlap the food list in a card type user interface, with a user interface of an application displayed on the display.

The memory may store at least one instructions configured to, when the second speech is recognized, allow the processor to execute an application providing information of food indicated by a mark contained in the second speech, so as to display food information, which is provided from the application, on the display.

The refrigerator may further include a communication circuitry, and the memory may store at least one instructions configured to, when the first speech is recognized, allow the processor to transmit data of the first speech to a server via the communication circuitry, and configured to, when the communication circuitry receives information on the food list transmitted from the server, allow the processor to display the food list on the display.

The refrigerator may further include a communication circuitry, and the memory may store at least one instructions configured to, when the second speech is recognized, allow the processor to transmit data of the second speech to a server via the communication circuitry, and configured to, when the communication circuitry receives food information transmitted from the server, allow the processor to display the food information on the display.

The refrigerator may further include a communication circuitry, and the memory may store at least one instructions configured to, when the first speech is recognized, allow the processor to transmit data of the first speech to a server via the communication circuitry, and configured to, when the communication circuitry receives analysis information on the first speech transmitted from the server, allow the processor to transmit a command according to the analysis information to an application, which is related to performance of an operation according to the analysis information, so as to allow the application to display the food list.

The refrigerator may further include a communication circuitry, and the memory may store at least one instructions configured to, when the second speech is recognized, allow the processor to transmit data of the second speech to a server via the communication circuitry, and configured to, when the communication circuitry receives analysis information on the second speech transmitted from the server, allow the processor to transmit a command according to the analysis information to an application, which is related to performance of an operation according to the analysis information, so as to allow the application to display the food information.

The refrigerator may further include a speaker, and the memory may store at least one instructions configured to, when the food list is displayed on the display due to the recognition of the first speech, allow the processor to output a speech indicating that the list is displayed, via the speaker, and configured to, when the food information is displayed on the display due to the recognition of the second speech, allow the processor to output a speech indicating that the food information is displayed, via the speaker.

Another aspect of the present disclosure provides a refrigerator including a storage compartment configured to store food, a temperature detector configured to detect an internal temperature of the storage compartment, a cooler configured to supply cool air to the storage compartment, a microphone configured to receive a speech, a display configured to display information, at least one processor configured to be electrically connected to the temperature detector, the microphone, and the display, and a memory configured to be electrically connected to the at least one processor.

The memory may store at least one instructions configured to, when a speech is input via the microphone, allow the processor to execute a command indicated by the input speech, on an application displayed on the display, and configured to, when the processor is not able to execute the command indicated by the input speech, on the application, allow the processor to execute the command on other application according to a priority that is pre-determined about applications related to the command.

The refrigerator may further include a speaker, and the memory may store at least one instructions configured to, when the processor is not able to execute the command indicated by the input speech, on the application, allow the processor to output a speech indicating that it is impossible to execute the command on the application, via the speaker.

The refrigerator may further include a speaker, and the memory may store at least one instructions configured to, when the priority is not present, allow the processor to output a speech requesting confirmation of whether to execute the command on other application, via the speaker.

The memory may store at least one instructions configured to, when an answer to the request of the confirmation is input, allow the processor to execute a command indicated by the speech on an application indicated by the input answer.

The memory may store at least one instructions configured to, when the processor is not able to execute the command indicated by the input speech, on the application, allow the processor to select an application, in which the command is to be executed, according to the priority that is pre-determined about applications related to the command, and configured to allow the processor to execute the command on the selected application.

The memory may store at least one instructions configured to, when a target, in which the command indicated by the speech is to be executed, is not contained in the speech input via the microphone, to allow the processor to execute the command indicated by the input speech, on the application displayed on the display.

Another aspect of the present disclosure provides a refrigerator including a storage compartment configured to store food, a temperature detector configured to detect an internal temperature of the storage compartment, a cooler configured to supply cool air to the storage compartment, a microphone configured to receive a speech, a display configured to display information, a speaker configured to output a speech, at least one processor configured to be electrically connected to the temperature detector, the microphone, and the display, and a memory configured to be electrically connected to the at least one processor.

The memory may store at least one instructions configured to, when a speech is input via the microphone and it is needed to identify a user for executing a command indicated by the speech, allow the processor to display a pre-registered user on the display, and configured to output a speech requesting of selecting a user among the displayed user, via the speaker.

The memory may store at least one instructions configured to, when a speech selecting at least one user among the displayed users is input, allow the processor to execute the command indicated by the speech, according to the selected user, and configured to allow the processor to display a result thereof on the display.

The memory may store at least one instructions configured to, when it is needed to identify a user for executing a command indicated by the speech, allow the processor to display the pre-registered user and a mark identifying each user on the display.

The memory may store at least one instructions configured to, when a speech selecting at least one marks among the marks is input, allow the processor to execute a command indicated by the speech, according to a user indicated by the mark, and configured to allow the processor to display a result thereof on the display.

The memory may store at least one instructions configured to, when a speech is input via the microphone and an expression indicating a user is contained in the speech, allow the processor to execute a command indicated by the speech, according to a user contained in the speech, and configured to allow the processor to display a result thereof on the display.

The memory may store at least one instructions configured to, when a speech is input via the microphone, allow the processor to execute a command indicated by the speech, according to a user indicated by speech data matching with the input speech among pre-stored speech data, and configured to allow the processor to display a result thereof on the display.

Another aspect of the present disclosure provides an information display method of a refrigerator including receiving a first speech including a food name via a microphone, displaying a food list including food information corresponding to the food name and an identification mark identifying the food information, on a display installed on the front surface of the refrigerator, based on the recognition of the first speech, receiving a second speech referring to the identification mark via the microphone, and displaying at least one piece of purchase information of food corresponding to the identification mark, on the display, based on the recognition of the second speech.

It is possible to provide a refrigerator capable of receiving a command in a speech by using a speech recognition technology and capable of outputting a content in a speech.

It is possible to provide a refrigerator capable of providing Internet shopping based on a command in a speech.

It is possible to provide a refrigerator capable of identifying a plurality of users and providing a content appropriate for the identified user.

DETAILED DESCRIPTION

Figure 1:
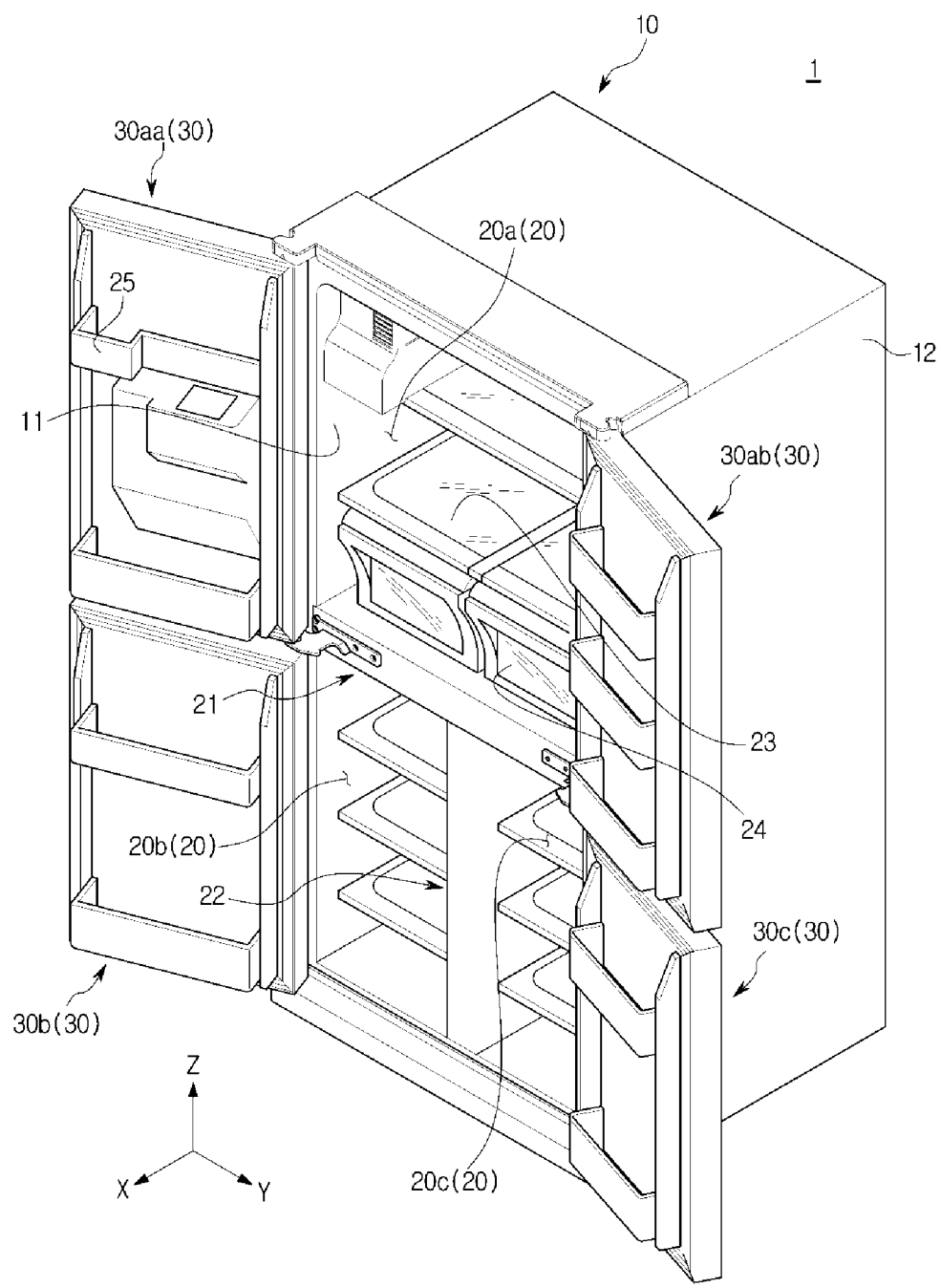
FIG. 1 is a view of an appearance of a refrigerator according to one embodiment of the present disclosure.

Embodiments described in the present disclosure and configurations shown in the drawings are merely examples of the embodiments of the present disclosure, and may be modified in various different ways at the time of filing of the present application to replace the embodiments and drawings of the present disclosure.

The terms used herein are used to describe the embodiments and are not intended to limit and/or restrict the present disclosure.

For example, the singular forms "a," "an" and "the" are intended to include the plural forms as well, unless the context clearly indicates otherwise.

In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element.

In the following description, terms such as "unit", "part", "block", "member" and "module" may indicate a unit for processing at least one function or operation. For example, the terms may indicate at least one process processed by at least one hardware such as Field Programmable Gate Array (FPGA), and Application Specific Integrated Circuit (ASIC), at least one software stored in a memory or a processor.

In addition, the term "food" is used to refer to industrial products manufactured by humans or machines or products produced or hunted by a user.

Hereinafter, exemplary embodiments of the present disclosure will be described in detail with reference to the accompanying drawings. The same reference numerals or signs shown in the drawings of the present disclosure indicate components or elements performing substantially the same function.

Figure 2:
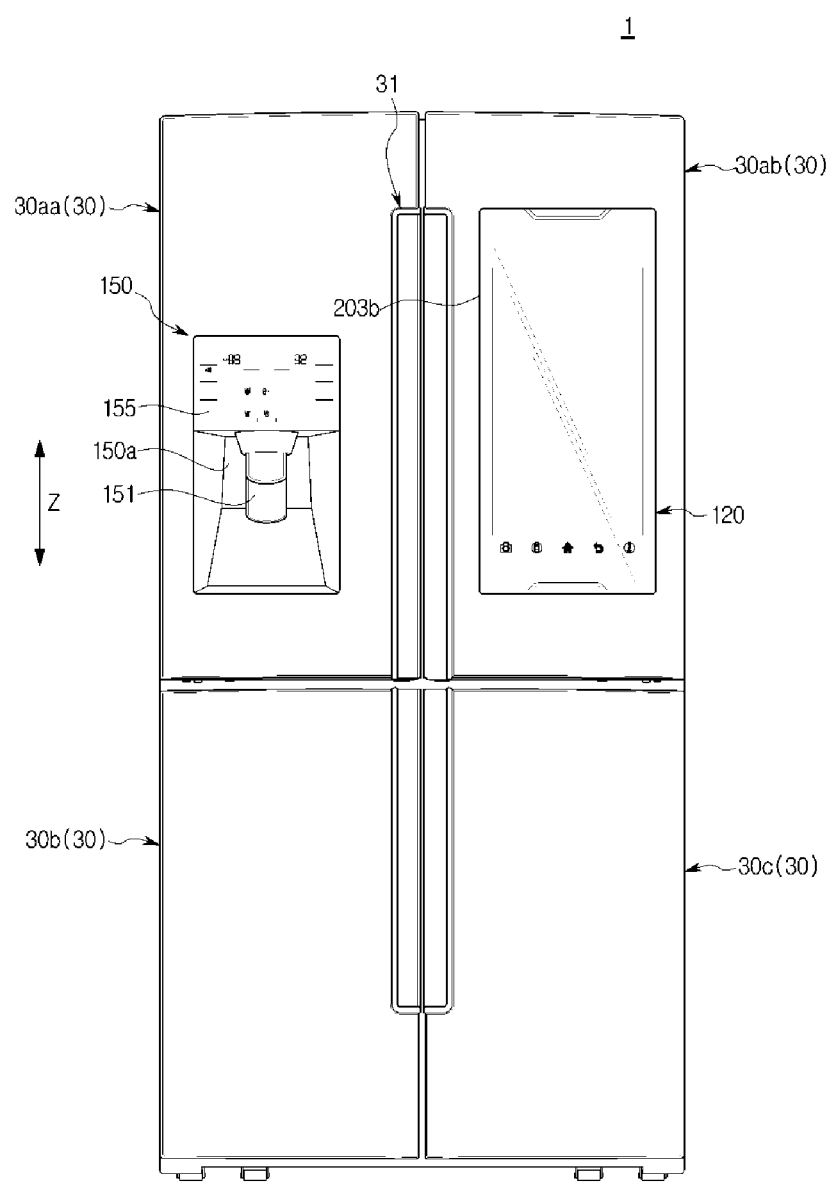
FIG. 2 is a front view of the refrigerator according to one embodiment of the present disclosure.
Figure 3:
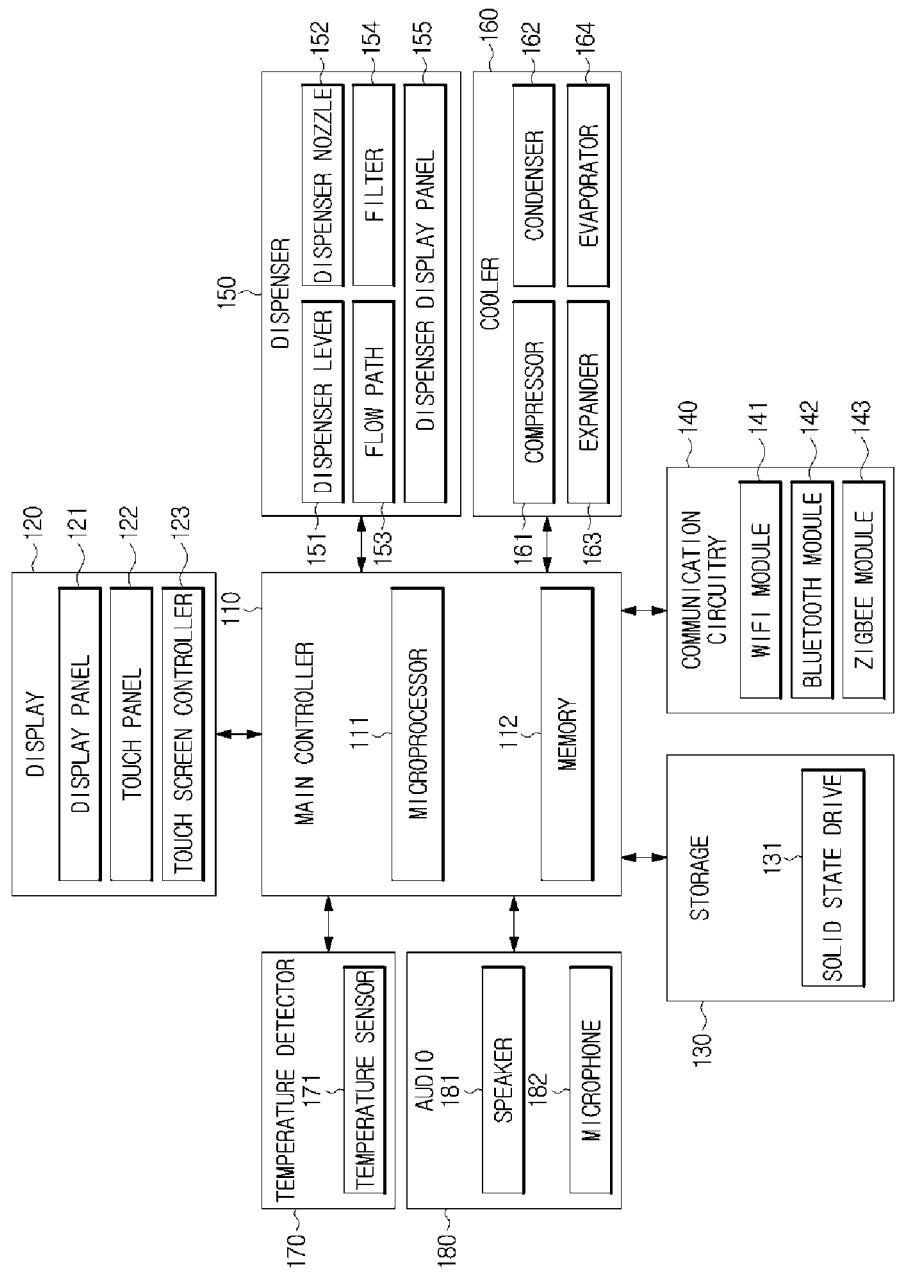
FIG. 3 is a block diagram of a configuration of the refrigerator according to one embodiment of the present disclosure.
Figure 4:
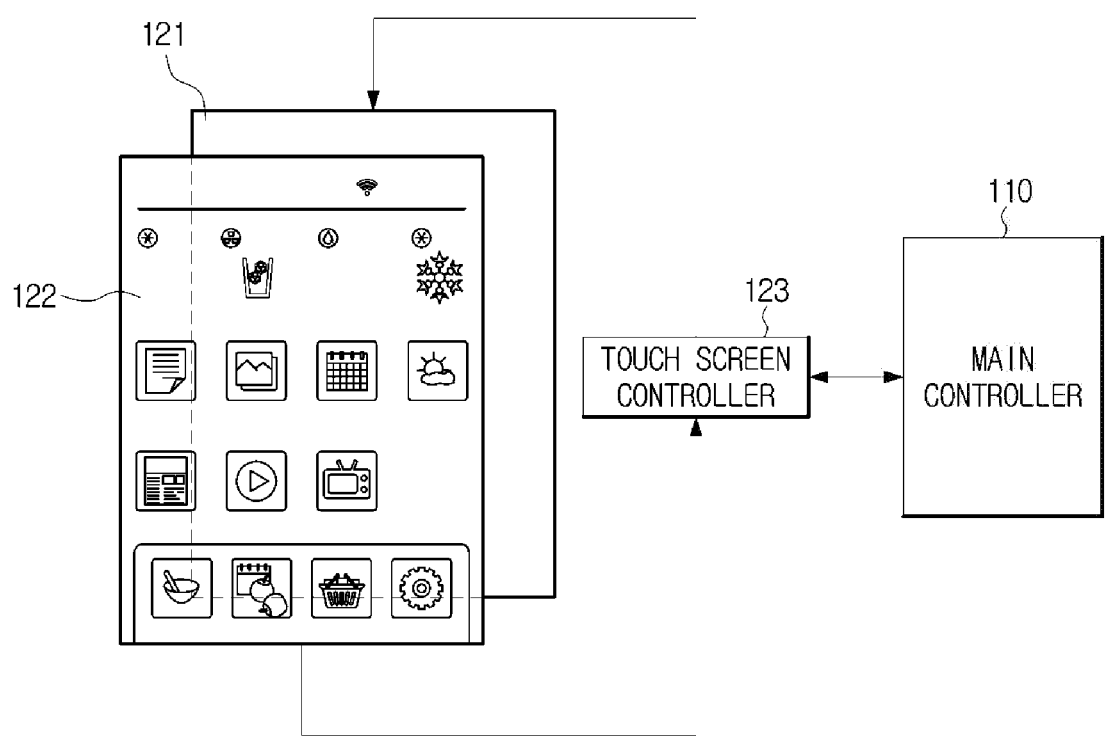
FIG. 4 is a view of a display included in the refrigerator according to one embodiment of the present disclosure.

FIG. 1 is a view of an appearance of a refrigerator according to one embodiment of the present disclosure, and FIG. 2 is a front view of the refrigerator according to one embodiment of the present disclosure. FIG. 3 is a block diagram of a configuration of the refrigerator according to one embodiment of the present disclosure, and FIG. 4 is a view of a display included in the refrigerator according to one embodiment of the present disclosure.

As illustrated in FIGS. 1, 2 and 3, a refrigerator 1 may include a body 10 including an open front surface, and a door 30 opening and closing the open front surface of the body 10. The body 10 is provided with a storage compartment 20 having an open front surface to keep food in a refrigeration manner or a frozen manner.

The body 10 may form an outer appearance of the refrigerator 1. The body 10 may include an inner case 11 forming a storage compartment 20 and an outer case 12 forming an appearance of the refrigerator by being coupled to the outside of the inner case 11. A heat insulating material (not shown) may be filled between the inner case 11 and the outer case 12 of the body 10 to prevent leakage of the cooling air of the storage compartment 20.

The storage compartment 20 may be divided into a plurality of storage compartments by a horizontal partition 21 and a vertical partition 22. For example, as illustrated in FIG. 1, the storage compartment 20 may be divided into an upper storage compartment 20*a*, a lower first storage compartment 20*b*, and a lower second storage compartment 20*c*. A shelf 23 on which food is placed, and a closed container 24 in which food is stored in a sealing manner may be provided in the storage compartment 20.

The storage compartment 20 may be opened and closed by the door 30. For example, as illustrated in FIG. 1, the upper storage compartment 20*a* may be opened and closed by an upper first door 30*aa* and an upper second door 30*ab*. The lower first storage compartment 20*b* may be opened and closed by a lower first door 30*b*, and the lower second storage compartment 20*c* may be opened and closed by a lower second door 30*c*.

The door 30 may be provided with a handle 31 easily opening and closing the door 30. The handle 31 may be elongated in the vertical command between the upper first door 30*aa* and the upper second door 30*ab*, and between the lower first door 30*b* and the lower second door 30*c*. Therefore, when the door 30 is closed, the handle 31 may be seen as being integrally provided.

Further, the refrigerator 1 may include at least one of a display 120, a storage 130, a communication circuitry 140, a dispenser 150, a cooler 150, a temperature detector 170, a audio 180, and a main controller 110.

The display 120 may interact with a user. For example, the display 120 may receive user input from a user and display an image according to the received user input.

The display 120 may include a display panel 121 displaying an image, a touch panel 122 receiving user input and a touch panel controller 123 controlling/driving the display panel 121 and the touch panel 122.

The display panel 121 may convert image data received from the main controller 110 into an optical image, which is viewed by a user, through the touch screen controller 123.

The display panel 101 may employ cathode ray tube (CRT) display panel, liquid crystal display (LCD) panel, light emitting diode (LED) panel, organic light emitting diode (OLED) panel, plasma display panel (PDP), and field emission display (FED) panel. However, the display panel 101 is not limited thereto, and the display panel 101 may employ various display means visually displaying an optical image corresponding to image data.

The touch panel 122 may receive a user's touch input and transmit an electrical signal corresponding to the received touch input to the touch screen controller 123.

Particularly, the touch panel 122 detects a user touch on the touch panel 122 and transmits an electrical signal corresponding to coordinates of the user touch point, to the touch screen controller 123. As will be described below, the touch screen controller 123 may acquire the coordinates of the user touch point based on the electrical signals received from the touch panel 122.

In addition, the touch panel 122 may be located on the front surface of the display panel 121. In other words, the touch panel 122 may be provided on a surface on which an image is displayed. Accordingly, the touch panel 122 may be made of a transparent material to prevent the image displayed on the display panel 121 from being distorted.

The touch panel 122 may employ a resistance film type touch panel or a capacitive touch panel. However, the touch panel 122 is not limited thereto, and thus the touch panel may employ a variety of input means detecting the user's touch or approach, and outputting an electrical signal corresponding to coordinates of the detected touch point or coordinates of approach point.

The touch screen controller 123 may drive/control an operation of the display panel 121 and the touch panel 122. Particularly, the touch screen controller 123 may drive the display panel 121 to allow the display panel 121 to display an optical image corresponding to the image data received from the main controller 110, and control the touch panel 122 to allow the touch panel to detect the coordinates of the user touch point.

Depending on embodiments, the touch screen controller 123 may identify the coordinates of the user touch point based on the electrical signal output from the touch panel 122, and transmit the identified coordinates of the user touch point to the main controller 110.

Further, depending on embodiments, the touch screen controller 123 may transmit the electrical signal output from the touch panel 122 to the main controller 110 to allow the main controller 110 to identify the coordinates of the user touch point.

The touch-screen controller 123 may include a memory (not shown) storing programs and data for controlling an operation of the display panel 121 and the touch panel 122, and a microprocessor (not shown) performing an operation for controlling the operation of the touch panel 121 and the touch panel 122 according to the program and data stored in the memory. In addition, the memory and the processor of the touch screen controller 123 may be provided as a separate chip or a single chip.

The display 120 may be installed in the door 30 for the user's convenience. For example, as illustrated in FIG. 2, the display 120 may be installed in the upper second door 30ab. Hereinafter the display 120 installed on the upper second door 30ab will be described. However, the position of the display 120 is not limited to the upper second door 30ab. For example, the dispenser 150 may be installed on any position as long as a user can see, such as the upper first door 30aa, the lower first door 30b, the lower second door 30c, and the outer case 12 of the body 10.

In addition, the display 120 may be provided with a wake up function that is automatically activated when a user approaches within a predetermined range. For example, when the user approaches within the predetermined range, the display 120 may be activated. In other words, the display 120 may be turned on. On the other hand, when the user is outside the predetermined range, the display 120 may be inactivated. In other words, the display 120 may be turned off.

The display 120 may display various screens or images. Screens or images displayed on the display 120 will be described in detail below.

The storage 130 may store control programs and control data for controlling the operation of the refrigerator 1 and various application programs and application data for performing various functions according to user input. For example, the storage 130 may include an operating system (OS) program for managing the configuration and resources (software and hardware) included in the refrigerator 1, an image display application for displaying images stored in advance, a video play application for playing video stored in advance, a much application for playing a music, a radio application for playing a radio, a calendar application for managing a schedule, a memo application for storing a memo, an on-line shopping mall application for purchasing food on line, and a recipe application for providing a recipe.

Further, the storage 130 may include non-volatile memory that does not lose program or data even when power is turned off. For example, the storage 130 may include large capacity flash memory or solid state drive (SSD) 131.

The communication circuitry 140 may transmit data to an external device or receive data from an external device under the control of the main controller 110.

The communication circuitry 140 may include at least one of communication modules 141, 142, and 143 transmitting and receiving data according to a predetermined communication protocol. For example, the communication circuitry 140 may include a WiFi (Wireless Fidelity: WiFi®) module 141 connecting to a local area network (LAN) via an access point, a Bluetooth (Bluetooth®) module 142 communicating with an external device in a one to one relationship or communicating with a small number of external device in a one to many relationship, and a ZigBee module 143 forming a LAN among a plurality of electronic device (mainly home appliances).

Further, the plurality of communication modules 141, 142, and 143 may include an antenna transmitting and receiving radio signal to and from the free space, and a modulator/demodulator modulating data to be transmitted or demodulating radio signals received.

Operations of the refrigerator 1 through the communication circuitry 140 are described in more detail below.

The dispenser 150 may discharge water or ice according to the user's input. In other words, the user may directly take out water or ice to the outside without opening the door 30 through the dispenser 150.

The dispenser 150 may include a dispenser lever 151 receiving a user's discharge command, a dispenser nozzle 152 discharging water or ice, a flow path 153 guiding water from an external water source to the dispenser nozzle 152, a filter 154 purifying water being discharged, and a dispenser display panel 155 displaying an operation state of the dispenser 150.

The dispenser 150 may be installed outside the door 30 or the body 10. For example, as illustrated in FIG. 2, the dispenser 150 may be installed in the upper first door 30aa. Hereinafter the dispenser 150 installed in the upper first door 30aa will be described. However, the position of the dispenser 150 is not limited to the upper first door 30aa. Therefore, the dispenser 150 may be installed on any position as long as a user can take out water or ice, such as the upper second door 30ab, the lower first door 30b, the lower second door 30c, and the outer case 12 of the body 10.

For example, the door 30 or the outer case 12 may be provided with a cavity 150a recessed inward of the refrigerator to form a space for taking out water or ice, and the cavity 150a may be provided with the dispenser nozzle 152 and the dispenser lever 151. When the user pushes the dispenser lever 151, water or ice is discharged from the dispenser nozzle 152.

Particularly, when water is discharged through the dispenser nozzle 152, water may flow from the external water source (not shown) to the dispenser nozzle 152 along the flow path 152. Further, the water may be purified by the filter 153 while flowing to the dispenser nozzle 152.

At this time, the filter 153 may be detachably installed in the body 10 or the door 30 and thus when the filter 153 is broken down, the filter 153 may be replaced by a new filter.

The cooler 160 may supply cool air to the storage compartment 20.

Particularly, the cooler 160 may maintain the temperature of the storage compartment 20 within a predetermined range by using evaporation of the refrigerant.

The cooler 160 may include a compressor 161 compressing gas refrigerant, a condenser 162 converting the compressed gas refrigerant into liquid refrigerant, an expander 163 reducing the pressure of the liquid refrigerant, and an evaporator 164 converting the pressurized liquid refrigerant into a gaseous state.

Particularly, the cooler 160 may supply cool air to the storage compartment 20 by using the phenomenon that the decompressed liquid refrigerant absorbs the thermal energy of the ambient air while being converted into the gas state.

However, the configuration of the cooler 160 is not limited to the compressor 161, the condenser 162, the expander 163 and the evaporator 164.

For example, the cooler 160 may include a Peltier element using Peltier effect. The Peltier effect means that heat is generated in one of the metals and heat is absorbed in the other metal when a current flows through a contact surface where the metals are in contact with each other. The cooler 160 may supply cool air to the storage compartment 102 using a Peltier element.

Alternatively, the cooler 160 may include a magnetic cooler using magnetocaloric effect. The magnetocaloric effect means that when a certain substance (magnetocaloric material) is magnetized, it releases heat, and when a certain substance (magnetocaloric material) is demagnetized, it absorbs heat. The cooler 160 may supply cool air to the storage compartment 20 using a magnetic cooler.

The temperature detector 170 may be placed inside the storage compartment 20 to detect the temperature inside the storage compartment 20. The temperature detector 170 may include a plurality of temperature sensors 171 installed in the plurality of storage compartments 20a, 20b, and 20c, respectively. In addition, each of the plurality of temperature sensors 171 may include a thermistor in which an electrical resistance varies with temperature.

The audio 180 may include a speaker 181 converting an electrical signal received from the main controller 110 into an acoustic signal and outputting the acoustic signal, and a microphone 182 converting the acoustic signal into an electrical signal, and outputting the electrical signal into the main controller 110.

Based on the user input received via the display 120 and/or the program and data stored in the storage 130, the main controller 110 may control the display 120, the storage 130, the communication circuitry 140, the dispenser 150, the cooler 160, the temperature detector 170 and the audio 180 contained in the refrigerator 1.

The main controller 110 may include a microprocessor 111 performing operations to control the refrigerator 1 and a memory 112 storing/memorizing programs and data related to the performance of the operation of the microprocessor 111.

The microprocessor 111 may load data stored/memorized in the memory 112 according to the program stored in the memory 112 and may perform an arithmetic operation or a logical operation on the loaded data. Further, the microprocessor 111 may output the result of the arithmetic operation or the logical operation to the memory 112.

The memory 112 may include a volatile memory that loses stored data when the power supply is stopped. The volatile memory may load programs and data from the above-described storage 130 and temporarily memorize the loaded data. In addition, the volatile memory may provide the memorized program and data to the microprocessor 111, and memorize the data output from the microprocessor 111. These volatile memories may include S-RAM, and D-RAM.

Further, the memory 112 may include a non-volatile memory as needed. The non-volatile memory may preserve the memorized data when the power supply is stopped. The non-volatile memory may store firmware for managing and initializing various components contained in the refrigerator 1. The non-volatile may include Read Only Memory (ROM), Erasable Programmable ROM (EPROM), Electrically Erasable Programmable ROM (EEPROM) and flash memory.

In addition, the main controller 110 may include a plurality of microprocessors 111 and a plurality of memories 112. For example, the main controller 110 may include a first microprocessor and a first memory controlling the temperature detector 170, the dispenser 150 and the cooler 160 of the refrigerator 1. The main controller 110 may include a second microprocessor and a second memory controlling the display 120, the storage 130, the communication circuitry 140, and the audio 180 of the refrigerator 1.

Although it has been described that the microprocessor 111 and the memory 112 are functionally distinguished, the microprocessor 111 and the memory 112 may be not physically distinguished from each other. For example, the microprocessor 111 and the memory 112 may be implemented as separate chips or a single chip.

The main controller 110 may control the overall operation of the refrigerator 1, and it may be assumed that the operation of the refrigerator 1 described below is performed under the control of the main controller 110.

Although it has been described that the main controller 110, the storage 130 and the communication circuitry 140 are functionally distinguished from each other in the above description, the main controller 110, the storage 130, and the communication circuitry 140 may be not physically distinguished from each other. For example, the main controller 110, the storage 130, and the communication circuitry 140 may be implemented as separate chips or a single chip.

Hereinbefore the display 120, the storage 130, the communication circuitry 140, the dispenser 150, the cooler 150, the temperature detector 170, the audio 180 and the main controller 180 contained in the refrigerator 1 have been described, but a new configuration may be added or some configuration may be omitted as needed.

Figure 5:
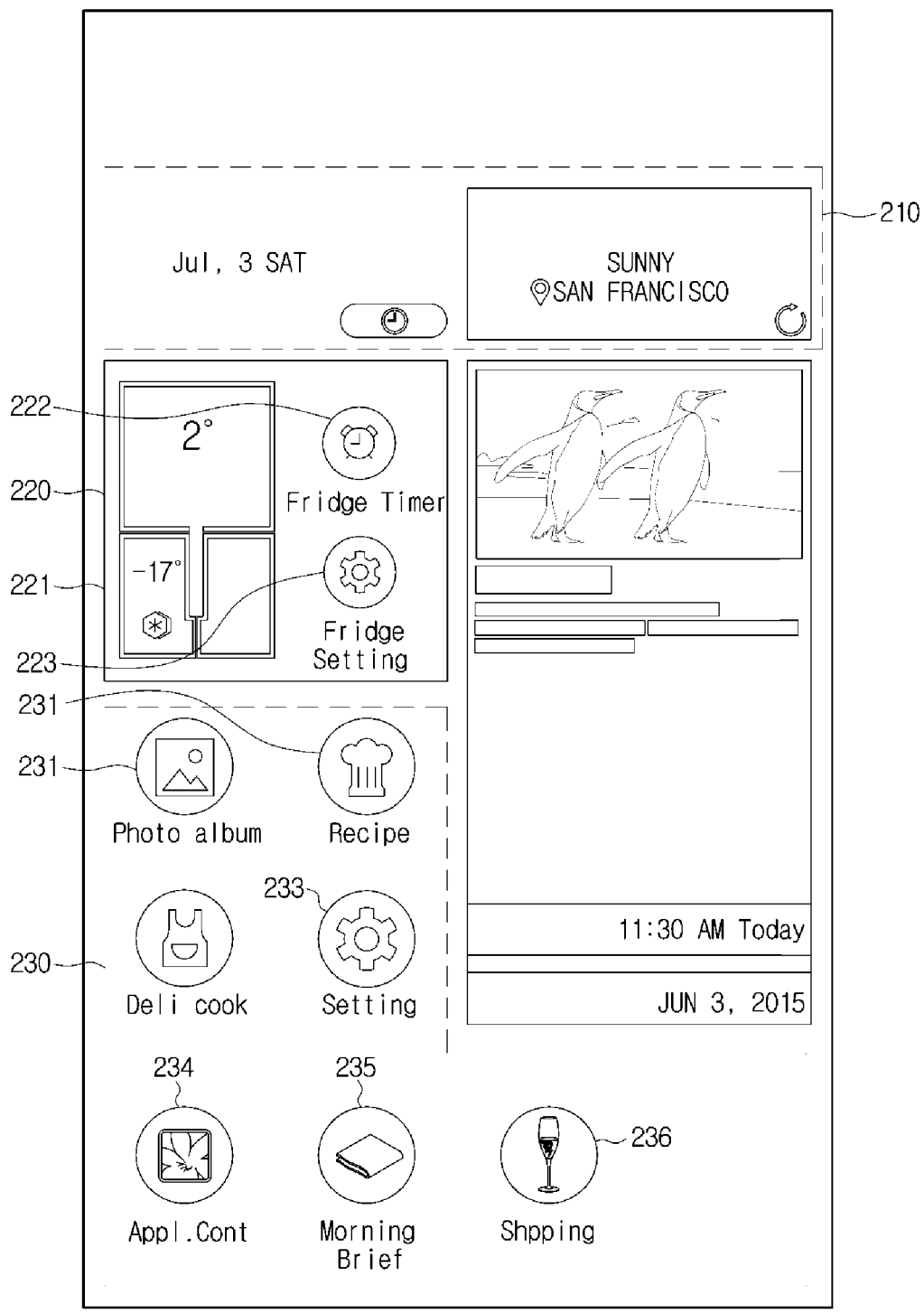
FIG. 5 is a view of a home screen displayed on the display included in the refrigerator according to one embodiment of the present disclosure.

FIG. 5 is a view of a home screen displayed on the display included in the refrigerator according to one embodiment of the present disclosure.

When the power is supplied to the refrigerator 1, the main controller 110 may allow the display 120 to display a home screen 200 as illustrated in FIG. 5.

A time/date area 210 displaying a time and date, an operational information area 220 displaying operation information of the refrigerator 1, and a plurality of launchers 230 for executing applications stored in the storage 130 may be displayed on the home screen 200.

Current time information and today's date information may be displayed on the time/date area 210. Further, location information (e.g., name of country or city) of the location where the refrigerator 1 is located may be displayed on the time/date area 210.

A storage compartment map 221 related to the operation of the plurality of storage compartments 20a, 20b, and 20c contained in the refrigerator 1 may be displayed on the operation information area 220.

Information related to the operation of the plurality of storage compartments 20a, 20b, and 20c contained in the refrigerator 1 may be displayed on the storage compartment map 221. For example, as illustrated in FIG. 5, the upper storage compartment 20a, the lower first storage compartment 20b, and the lower second storage compartment 20c may be partitioned and displayed on the storage compartment map 221, and a target temperature of the first lower storage compartment 20a, a target temperature of the lower first storage compartment 20b, and a target temperature of the lower second storage compartment 20c may be displayed on the storage compartment map 221.

When the user touches the region indicating the respective storage compartment 20a, 20b, and 20c, the main controller 110 may display an image for indicating the target temperature of each storage compartment 20a, 20b, and 20c on the display 120. For example, when the user touches the region indicating the upper storage compartment 20a in the storage compartment map 221, an image for setting the target temperature of the upper storage compartment 20a may be displayed on the display 120.

Further, a timer setting icon 222 and a refrigerator setting icon 223 for executing an application controlling the operation of the refrigerator 1 may be displayed on the operational information area 220.

Based on the timer setting icon 222 being touched by the user, a timer setting screen for setting a target time of the timer may be displayed on the display 120. For example, the user can input a time at which an alarm will be output or a time interval until an alarm will be output, via the timer setting image. The refrigerator 1 may output the alarm at the time input by the user, or the refrigerator 1 may output the alarm at the time when the time interval input by the user elapses.

Based on the refrigerator setting icon 223 being touched by the user, the main controller 110 may display an operation setting screen for inputting a setting value for controlling the operation of the refrigerator 1, on the display 120. For example, via the operation setting screen, the user can set the target temperature of each of the plurality of storage compartments 20a, 20b, and 20c contained in the refrigerator 1, and set the selection between the water and the ice to be discharged through the dispenser 150.

Further, the plurality of launchers 230 for executing applications stored in the storage 130 may be displayed on the home screen 200.

For example, an album launcher 231 for executing an album application displaying pictures stored in the storage 130, a recipe launcher 232 for executing an recipe application providing food recipes, and a screen setting launcher 233 for executing a screen setting application controlling the operation of the display 120 may be displayed on the home screen 200.

In addition, a home appliance control launcher 234 for executing a home appliance control application controlling various home appliances through the refrigerator 1, a speech output setting launcher 235 for setting an operation of a speech output application outputting various contents in a speech, and an online shopping launcher 236 for executing a shopping application for online shopping may be displayed on the home screen 200.

As mentioned above, on the home screen 200 of the refrigerator 1, main information related to the operation of the refrigerator 1 and launchers for executing the variety of applications may be displayed.

However, the drawing shown in FIG. 5 is merely an example of the home screen 200, and thus the refrigerator 100 may display various types of home screen according to the user's settings. Further, information and launchers displayed on the home screen are not limited to FIG. 5.

Figure 6:
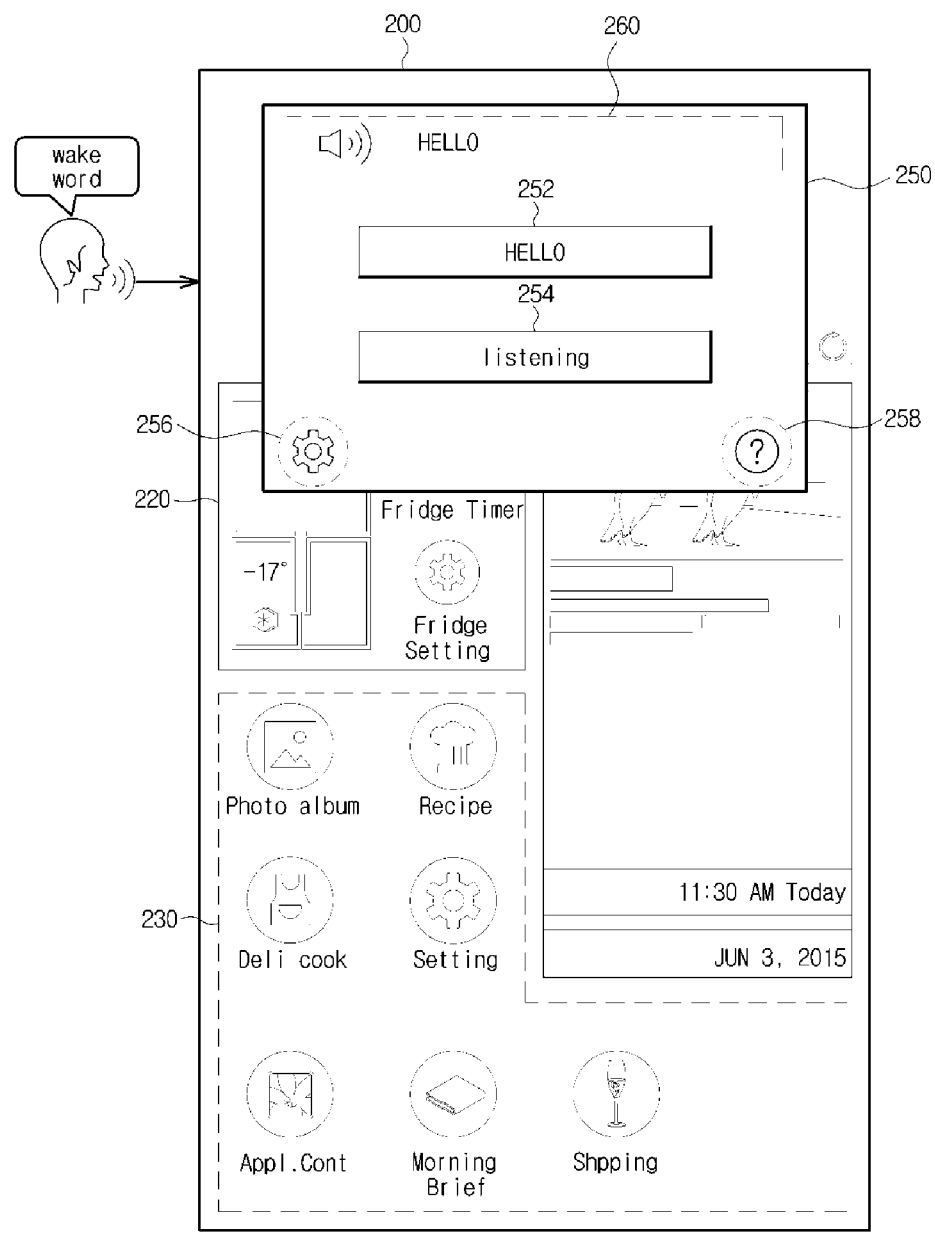
FIGS. 6 and 7 are views of a speech recognition application displayed on the display included in the refrigerator according to one embodiment of the present disclosure.

FIG. 6 illustrates a user interface (UI) of a speech recognition displayed on the display 120 of the refrigerator according to one embodiment of the present disclosure. Hereinafter the main controller is referred to as a controller for convenience.

The controller 110 may display a speech recognition user interface (UI) 250 on the display 120 based on a predetermined wake word being input via the microphone 182. The speech recognition UI 250 having a configuration illustrated in FIG. 6 may be displayed on the display 120. The wake word may be composed of a predetermined word or a combination of words, and may be changed to an expression desired by the user.

The controller 110 may execute a speech recognition function using a wake word uttered by the user, as described above. Alternatively, as illustrated in FIG. 7, the controller 110 may execute a speech recognition function when a microphone-shaped button 271 displayed on a notification UI is touched.

The shape of the launcher indicating a button for executing the speech recognition function is not limited to the shape of the microphone and thus may be implemented in a variety of images.

Figure 7:
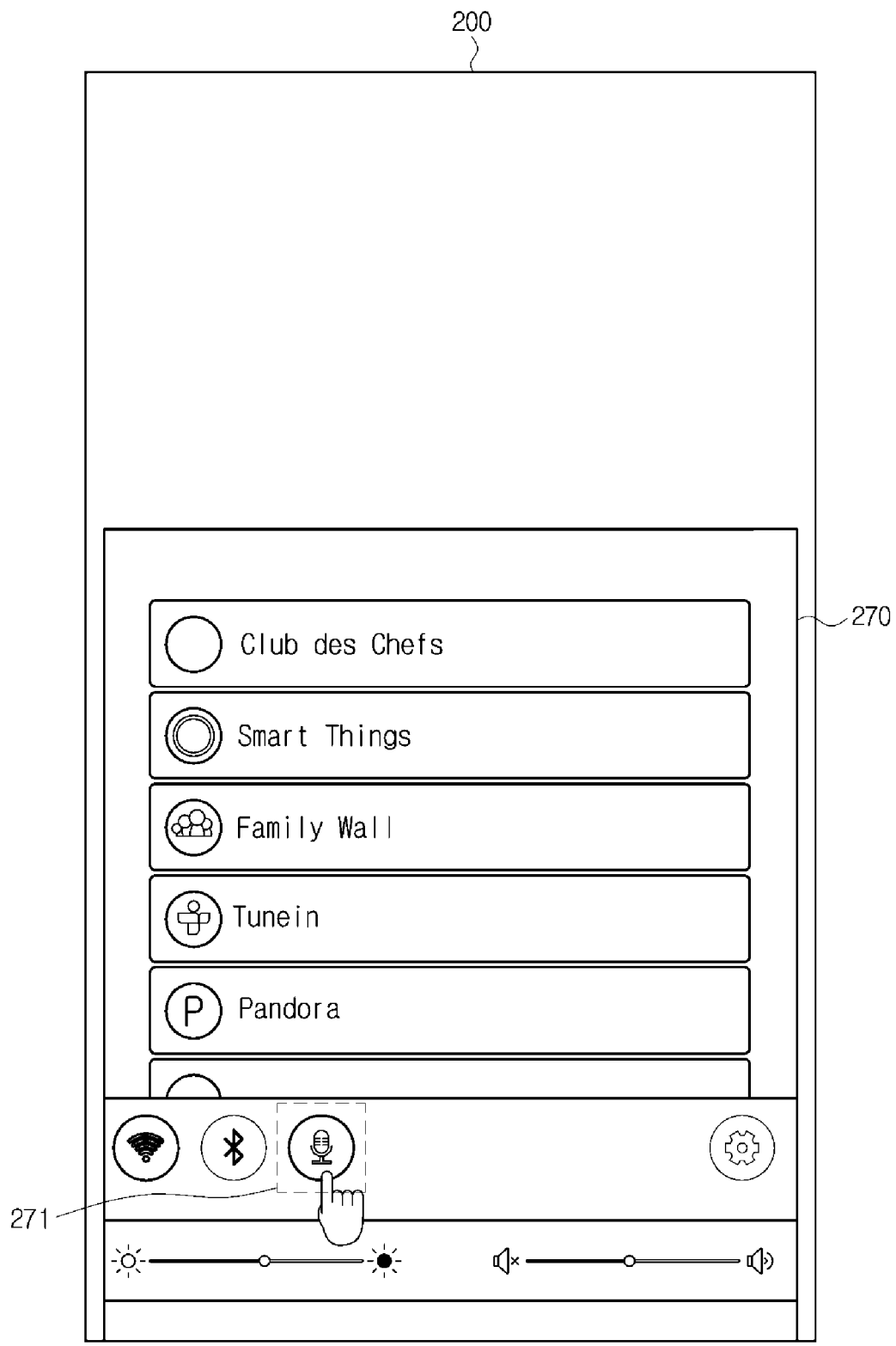

The notification UI may be displayed on the display 120 as illustrated in FIG. 7, when a touch gesture is input. The touch gesture represents swiping upward while a specific point at the bottom of the display 120 is touched. The launcher for executing the speech recognition function may be displayed on the notification UI or the home screen 200 of the display 120.

The controller 110 may identify the user intention by recognizing and analyzing the user speech composed of natural language by using the speech recognition function, and may perform a command according to the user intention. Further, by outputting a process or result of a command according to a user intention, as a speech, the controller 110 may allow the user to acoustically recognize the process or the result of the speech command.

When the speech recognition function is activated, the speech recognition UI 250 may be displayed on the display 120, as illustrated in FIGS. 6 and 7. The speech recognition UI 250 may include a first area 252 on which a word or a sentence, which is output as a speech by using a text to speech (TTS) function, is displayed, a second area 254 on which a state of the speech recognition function is displayed, a third area 260 indicating that a speech is outputting through the TTS function, a setting object 256 for setting the speech recognition function and a help object 258 providing a help for the use of the speech recognition function.

The second area 254 on which a state of the speech recognition function is displayed may display a state in which the user speech is inputting, a state for waiting the input of the user speech, or a state in which a process according to the input of the user speech is processing, in a text manner. For example, the state in which the user speech is inputting may be displayed as "listening", the state for waiting may be displayed as "standby" and the state in which the process is processing may be displayed as "processing". The above-mentioned English text is merely an example and thus the state may be displayed in Korean text or may be displayed as an image rather than text.

As illustrated in FIGS. 6 and 7, the speech recognition UI 250 may be displayed as a card type UI that is pop-up on the home screen 200 or displayed on an entire screen of the display 120.

Based on the user speech being input through the microphone 182, the controller 110 may transmit speech data to a first server SV1 described later, and execute a command by receiving information, which is acquired by analyzing the speech, from the first server SV1.

Figure 8:
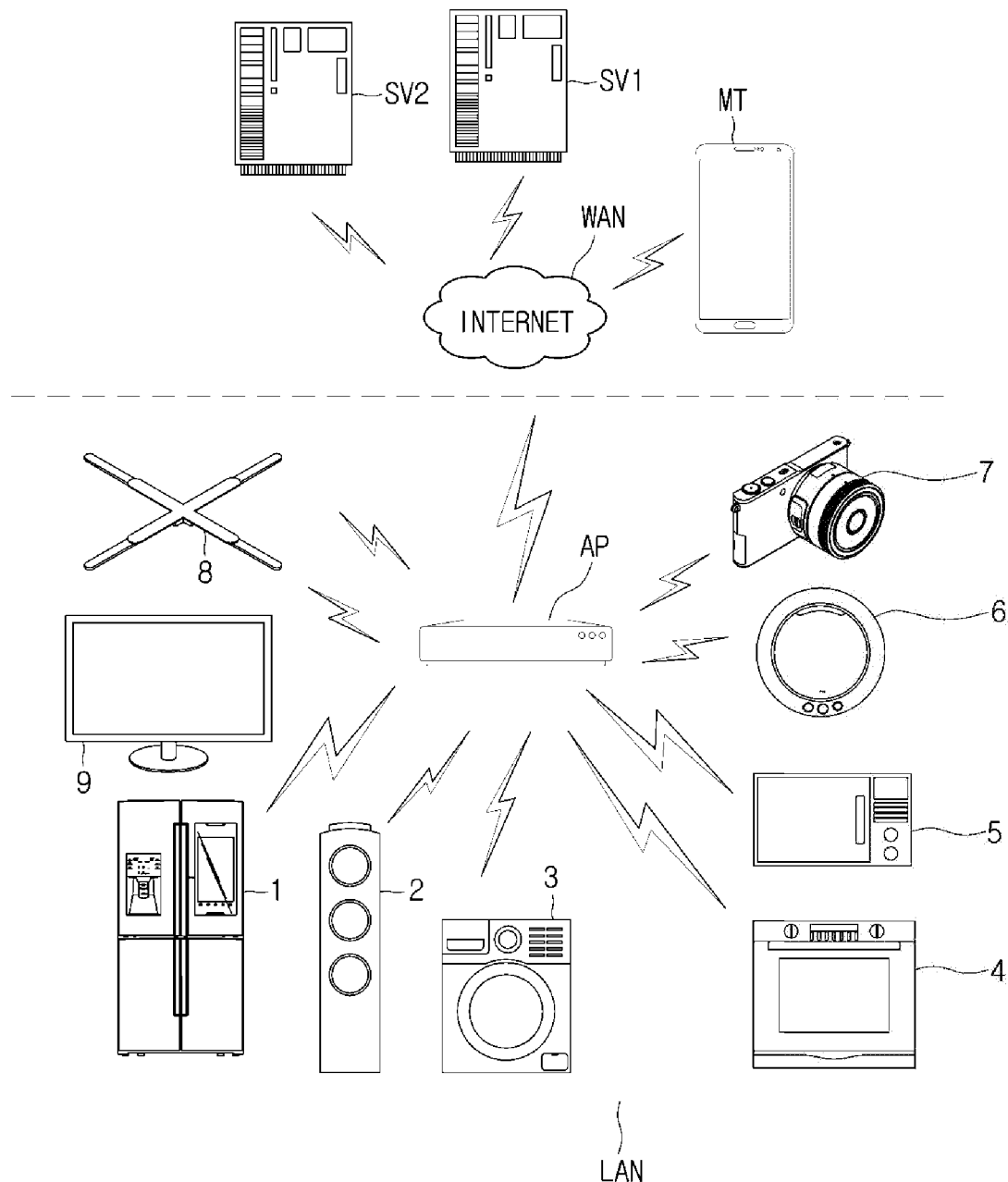
FIG. 8 is a view illustrating a communication with an external device through a communication circuitry included in the refrigerator according to one embodiment of the present disclosure.
Figure 9:
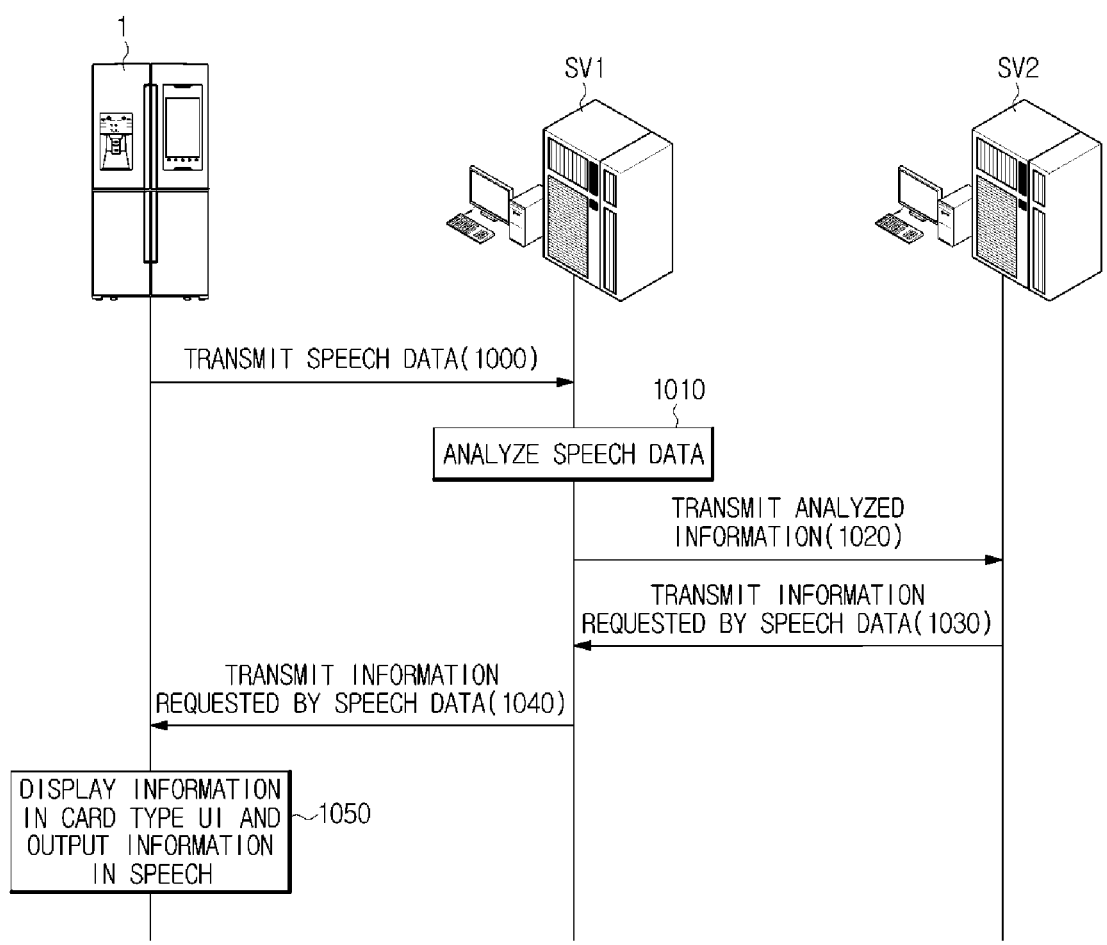
FIGS. 9 and 10 are views illustrating a communication between a server and the refrigerator according to one embodiment of the present disclosure.
Figure 10:
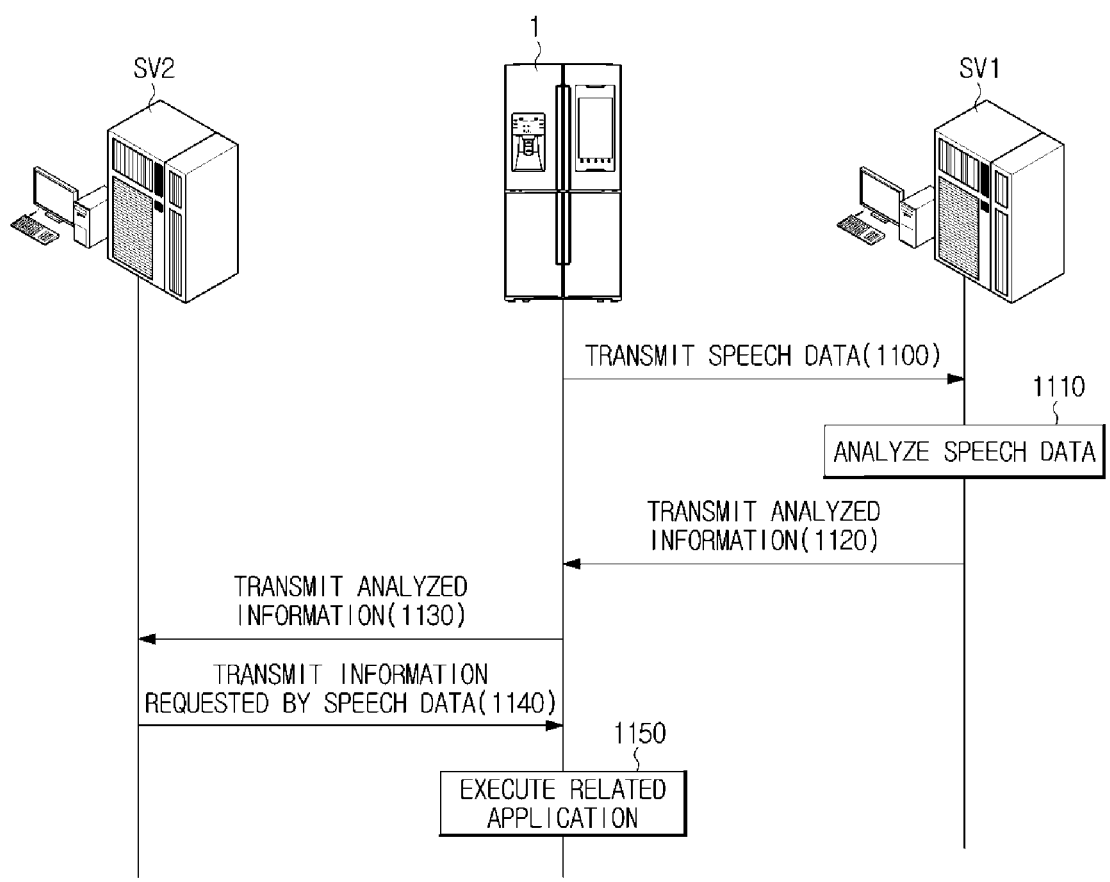

FIG. 8 is a view illustrating a communication with an external device through a communication circuitry included in the refrigerator according to one embodiment of the present disclosure, and FIGS. 9 and 10 are views illustrating a communication between a server and the refrigerator according to one embodiment of the present disclosure.

The refrigerator 1 may communicate with various electronic devices as well as the servers SV 1 and SV 2 through the communication circuitry 140.

For example, as illustrated in FIG. 8, the refrigerator 1 may be connected to an access point (AP) via the communication circuitry 140. Particularly, the refrigerator 1 may be connected to the access point (AP) by using a wireless communication standard such as Wi-Fi™ (IEEE 802.11), Bluetooth™ (IEEE 802.15.1) and Zigbee (IEEE 802.15.4).

The AP may be referred to as "hub", "router", "switch", or "gateway" and the AP may be connected to a wide area network (WAN).

As well as the refrigerator 1, various electronic devices such as an air conditioner 2, a washing machine 3, an oven 4, a microwave oven 5, a robot cleaner 6, a security camera 7, a light 8 and a television 9 may be connected to the AP. The electronic devices 1-9 connected to the AP may form a local area network (LAN).

The AP may connect the LAN formed by the electronic devices 1-9 connected to the AP, to the WAN such as Internet.

The first server SV1 providing information, which is acquired by analyzing speech data, to the refrigerator, and the second server SV2, which is operated by a provider providing information through an application installed in the refrigerator, may be connected to the WAN. For example, the second server SV2 may include a server (hereinafter referred to as "store server") selling food online via a shopping application such as a store application provided in the refrigerator, a server (hereinafter referred to as "weather server") providing information to a weather application, a server (hereinafter referred to as "recipe server") providing information on recipes, to a recipe application, and a server (hereinafter referred to as "music server") providing information on music, to a music application.

Further, a mobile terminal (MT) may be connected to the WAN. The MT may be directly connected to the WAN or may be connected to the WAN through the AP according to the location of the MT. For example, when the MT is located close to the AP, the MT may be connected to the WAN through the AP. When the MT is located far from the AP, the MT may be directly connected to the WAN through a mobile communication service provided by a mobile communication service provider.

Via the AP, the refrigerator 1 may transmit data to the first server SV1 and/or the second server SV2, and receive data from the first server SV1 and/or the second server SV2.

For example, via the AP, the refrigerator 1 may transmit data of user speech input via the microphone 182, to the first server SV1 and the first server SV1 may transmit analysis information including the user intention, which is acquired by analyzing the speech data, to the refrigerator.

Via the AP, the refrigerator 1 may transmit the analyzed information of the user speech data to the second server SV2 and may receive information, which is food information related to a certain application such as the store application, from the second server SV2.

As described above, the refrigerator 1 may communicate with the first server SV1 and receive the analysis information of the user speech data via the first server SV1. The refrigerator 1 may communicate with the second server SV2 and receive the information related to the certain application via the second server SV2. Hereinafter the communication between the refrigerator and the server will be described in more detail with reference to FIGS. 9 and 10.

As illustrated in FIG. 9, the refrigerator 1 transmits speech data to the first server SV1 when a speech command being uttered from the user is input (1000). Based on the speech data being received, the first server SV1 may derive the user intention by analyzing the speech data (1010).

Based on user speech command being input via the microphone 182, the controller 110 of the refrigerator 1 converts an analog speech signal into speech data that is a digital signal and transmits the speech data to the first server SV1 through the communication circuitry 140.

The controller 110 of the refrigerator 1 may convert an analog speech signal into a digital speech signal in a pulse code modulation method. For example, based on a speech command, such as "let me know today weather" being input, the controller 110 of the refrigerator 1 may convert the speech command into a digital signal and transmit the digital signal to the first server SV1.

The first server SV1 may include an automatic speech recognition (ASR) portion configured to remove a noise by performing a pre-processing on the speech data, which is transmitted from the refrigerator 1, and configured to convert the speech data into a text by analyzing the speech data, and a natural language understanding (NLU) portion configured to identify a user intention based on the text, which is acquired by the conversion by the automatic speech recognition portion. Alternatively, the first server SV1 may include a learning network model that is trained using an artificial intelligence algorithm. In this case, the first server SV1 may identify (or recognize, estimate, infer, predict) the user intention by applying speech data transmitted from the refrigerator 1 to the learning network model.

For example, based on the speech data, the automatic speech recognition portion and the natural language understanding portion of the first server SV1 may identify the user intention as requiring information about weather in the area where the current user is located.

The first server SV1 may transmit the analysis information of the speech data to the second server SV2 (1020), and the second server SV2 may transmit information, which is requested by the speech data according to the analysis information of the speech data, to the first server SV1 (1030). The first server SV1 may transmit the information, which is transmitted from the second server SV2, to the refrigerator 1 (1040).

Based on the user intention contained in the speech data, the first server SV1 selects the second server SV2 providing information to an application related to the user intention, and the first server SV1 transmits the analysis information of the speech data to the selected second server SV2.

For example, based on the user intention contained in the speech data, which is identified as the requirement for information on the weather of the area where the user is placed, the first server SV1 may transmit the analysis information of the speech data to the weather server providing information to the weather application among the second servers SV2.

The second server SV2 may search for information matching with the user intention, based on the analysis information of the speech data, and transmit the searched information to the first server SV1. For example, the weather server may generate the current weather information of the area where the user is located, based on the analysis information of the speech data, and transmit the generated weather information to the first server SV1. The first server SV1 converts the information transmitted from the second server SV2 into a JavaScript Object Notation (JSON) file format and transmits the JSON file format to the refrigerator 1.

The refrigerator 1 displays the information transmitted from the first server SV 1 on the display 120 as a card type user interface (UI), and outputs the information in a speech (1050).

Based on the information in the JSON file format, which is transmitted from the first server SV1 and received by the communication circuitry 140 of the refrigerator 1, the controller 110 of the refrigerator 1 may display the received information on the display 120 as the card type UI, and output the received information in a speech by using the TTS function.

For example, based on the information in the JSON file format, which is about the current weather of the user's location and transmitted from the first server SV1, the controller 110 of the refrigerator 1 may display information including the user location, time and weather, on the display 120 as the card type UI. The controller 110 may output the weather information displayed in the card type UI, as a speech such as "Today's current weather in ** street is 20 degrees Celsius, humidity is 50 percent and clear without clouds".

Meanwhile, referring to FIG. 10, the refrigerator 1 transmits the speech data to the first server SV1 based on the speech command uttered by the user (1100). Based on the speech data being received, the first server SV1 may derive the user intention by analyzing the speech data (1110).

Based on a user speech command being input via the microphone 182, the controller 110 of the refrigerator 1 converts an analog speech signal into speech data that is a digital signal, and transmits the speech data to the first server SV1 through the communication circuitry 140.

The controller 110 of the refrigerator 1 may convert an analog speech signal into a digital speech signal in a pulse code modulation method. For example, based on a speech command, such as "play next song" being input, the controller 110 of the refrigerator 1 may convert the speech command into a digital signal and transmit the digital signal to the first server SV1. In addition, based on a speech command, such as "let me know apple pie recipe" being input, the controller 110 of the refrigerator 1 may convert the speech command into a digital signal and transmit the digital signal to the first server SV1.

The first server SV1 may include an automatic speech recognition (ASR) portion configured to remove a noise by performing a pre-processing on the speech data, which is transmitted from the refrigerator 1, and configured to convert the speech data into a text by analyzing the speech data, and a natural language understanding (NLU) portion configured to identify a user intention based on the text, which is acquired by the conversion by the automatic speech recognition portion. Alternatively, the first server SV1 may include a learning network model that is trained using an artificial intelligence algorithm. In this case, the first server SV1 may identify (or recognize, estimate, infer, predict) the user intention by applying speech data transmitted from the refrigerator 1 to the learning network model.

For example, based on the speech data, the automatic speech recognition portion and the natural language understanding portion of the first server SV1 may identify the user intention as asking to play the next song to the song currently being played. In addition, based on the speech data, the automatic speech recognition portion and the natural language understanding portion of the first server SV1 may identify the user intention as asking an apple pie recipe.

The first server SV1 may transmit the analysis information of the speech data to the refrigerator 1 (1120), and the refrigerator 1 may transmit the analysis information of the speech data to the second server SV2 (1130). The second server SV2 may transmit information, which is requested by the speech data according to the analysis information of the speech data, to the refrigerator 1 (1140).

When the user intention is identified by analyzing the speech data, the first server SV1 converts the analysis information of the user speech data into a JSON file format, and transmits the JONS file format to the refrigerator 1.

When the communication circuitry 140 of the refrigerator 1 receives the analysis information in the JONS file format transmitted from the first server SV1, the controller 110 of the refrigerator 1 may select an application based on the analysis information and output the analysis information to the selected application.

For example, when the user intention is identified as a request for playing the next song to the song currently played, based on the analysis information in the JONS file format, the controller 110 of the refrigerator 1 may select the music application as an application capable of performing a function related to the user intention. The controller 110 may transmit a command for requesting to play the next song, to the selected music application.

For example, when the user intention is identified as a request for an apple pie recipe, based on the analysis information in the JONS file format, the controller 110 of the refrigerator 1 may select the recipe application as an application capable of performing a function related to the user intention. The controller 110 may transmit a command for requesting information on the apple pie recipe, to the selected recipe application.

Based on the analysis information being output to the selected application, the selected application may transmit the analysis information to the second server SV2 providing information. The second server SV2 may search for information meeting the user intention based on the analysis information of the speech data and transmit the searched information to the refrigerator 1.

For example, upon receiving the analysis information output from the controller 110, the music application may request information on the next song to the second server SV2 providing information to the music application, which is the music server.

The music server may select the next song to the currently played song based on the analysis information of the speech data, and provide information on the selected next song, to the music application.

In addition, upon receiving the analysis information being output from the controller 110, the recipe application may request information on the apple pie recipe to the second server SV2, which is configured to provide information to the recipe application and corresponds to the recipe server. The recipe server may provide a pre-stored apple pie recipe to the recipe application based on the analysis information of the speech data or search for other apple pie recipe and provide the searched recipe to the recipe application.

Based on the information transmitted from the second server SV2 being received, the refrigerator 1 may execute the related application according to the received information (1150).

When the communication circuitry 140 of the refrigerator 1 receives the information transmitted from the second server SV2, the controller 110 may execute the selected application to provide information corresponding to the user speech according to the information transmitted from the second server SV2.

For example, the controller 110 executes the music application upon receiving the information on the next song being transmitted from the music server. The music application may stop playing the current song and play the next song according to the information on the next song transmitted from the music server. A music application UI may be displayed on the display 120 of the refrigerator 1 and thus the information on the play of the next song may be displayed. The output of the currently played song may be stopped and the next song may be output through the speaker 181 of the refrigerator 1.

In addition, the controller 110 executes the recipe application upon receiving the information on the apple pie recipe being transmitted from the recipe server. A recipe application UI may be displayed on the display 120 of the refrigerator 1 and thus the apple pie recipe may be displayed. A speech for reading the apple pie recipe may be output through the speaker 181 of the refrigerator 1.

As illustrated in FIG. 9, the information on the user speech may be received via the communication between the first server SV1 and the second server SV2. As illustrated in FIG. 10, the information on the user speech may be received via the communication between the refrigerator 1 and the second server SV2.

FIGS. 11A to 14 are views illustrating a method for a user to purchase food through the refrigerator according to one embodiment of the present disclosure.

Figure 11A:
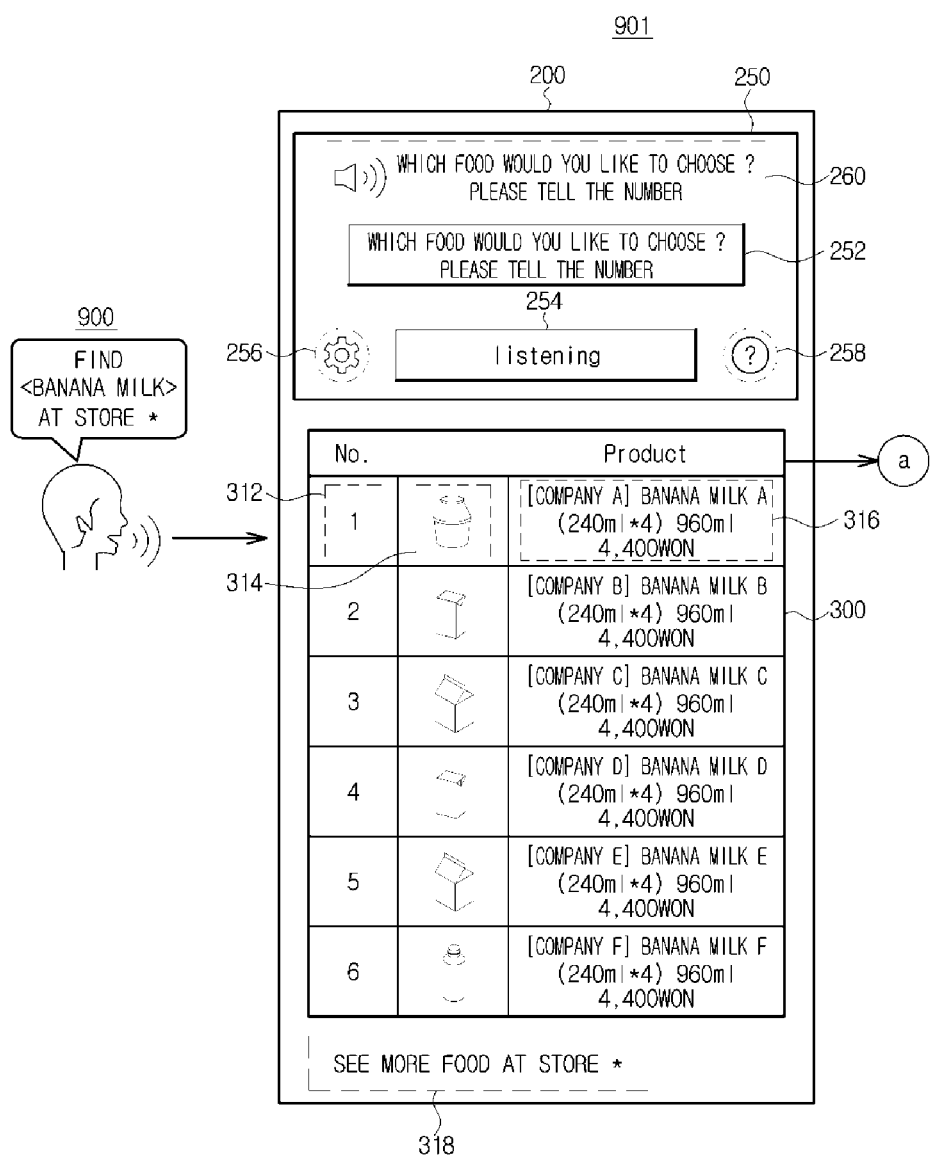
FIGS. 11A to 14 are views illustrating a method for a user to purchase food through the refrigerator according to one embodiment of the present disclosure.

As illustrated in FIG. 11A, a speech for ordering a certain food with a wake word may be input via the microphone 182 (900). Based on the wake word being recognized, the controller 110 may analyze the user speech by executing the speech recognition function, receive a food list contained in the user speech 300 from the related application (e.g., store application), and display the food list in the card type UI on the display 120 (901).

The refrigerator 1 may analyze the user speech through the communication with the first server SV1 by the method illustrated in FIG. 9, so as to identify the user intention, and receive information, which is related to the user intention (e.g., food list) and transmitted from the second server SV2, via the first server SV1. The received information may be used as an input value of an application for displaying a food list, and thus the food list 300 may be displayed in the card type UI as illustrated in FIG. 11A. For example, the result of the analysis of the user speech may be a food name. The food name may include not only the exact name of the food but also an idiom or slang referring to the food, a part of the food name, and a name similar to the food name. Further, the food name may also be an alias that is uttered or registered by the user of the refrigerator 1.

The food list 300 may be displayed in the card type UI at the bottom of the speech recognition UI 250. The food list 300 may include a representative image 314 representing the food, food information 316 including the manufacturer, the name of the food, the amount, the quantity and the price, and an identification mark 312, which is configured to distinguish the corresponding food from other food and is displayed in figures.

Since a mark capable of distinguishing a plurality of food from each other is sufficient to be the identification mark, the identification mark may be displayed in figures or characters.

A tab 318 may be displayed at the bottom of the food list 300, and the tab 318 may be selected when the user wants to find more food than the food contained in the food list 300. The tab 318 may be displayed in a text "see more food at store*" indicating the function of the tab 318. When the user touches the tab 318, the store application providing the food information may be executed and thus the food information may be displayed on the display 120.

Through the speaker 181, the controller 110 may output the food list 300 and a speech requesting confirmation about the selection of the food among the food contained in the food list 300. On the third area 260 of the speech recognition UI 250, the controller 110 may display a microphone-shaped image indicating that the speech is outputting through the speaker 181. Further, the speech output through the speaker 181 may be displayed in the text on the first area 250 of the speech recognition UI.

In various embodiments, the controller 110 may recognize a first speech including the food name via the microphone 182. For example, the controller 110 may convert the first input speech into a digital speech signal. The controller 110 may recognize the digital speech signal through the learning network model, which is trained using the artificial intelligence algorithm, thereby acquiring the food name corresponding to the first speech. The food name contained in the first speech and the food name acquired by the recognition may be the same or different from each other. For example, the food name contained in the first speech may be an idiomatic word, an alias, or a part of the food name, but the food name acquired by the recognition may be the full name, the sale name, or the trademark name.

The learning network model recognizing the first speech may be stored in the storage 130 or in the first server SV1 recognizing first speech data by receiving the first speech data.

When the leaning network model is stored in the first server SV1, the controller 110 may transmit the first speech, which is converted into the digital speech signal, to the first server SV1. The first server SV1 may recognize (or estimate, infer, predict, identify) the food name corresponding to the first speech by applying the first speech as an input value to the learning network model that is trained using the artificial intelligence algorithm. Based on the result of the recognition, the first server SV1 may transmit the food name corresponding to the first speech to the controller 110. Alternatively, when the leaning network model is stored in the storage 130, the controller 110 may recognize the food name corresponding to the first speech by applying the first speech, which is converted into the digital speech signal, to the learning network model stored in the storage 130.

When the food name is acquired by using the learning network model, the controller 110 may display the food list 300, which includes food information 316 on the acquired food name and the identification mark 312 for distinguishing the food from other food, on the display 120.

Next, through the microphone 182, the controller 110 may recognize a second speech referring to the identification mark 312 of the food list. The controller 110 may convert the second input speech into a digital speech signal. The controller 110 may acquire an identification mark corresponding to the second speech by recognizing the digital speech signal through the learning network model that is trained using the artificial intelligence algorithm. The learning network model recognizing the second speech may be stored in the storage 130 or in the first server SV1 analyzing speech data.

When the leaning network model is stored in the first server SV1, the controller 110 may transmit the second speech, which is converted into the digital speech signal, to the first server SV1. The first server SV1 may recognize (or estimate, infer, predict, identify) the identification mark corresponding to the second speech by applying the second speech as an input value to the learning network model that is trained using the artificial intelligence algorithm. Based on the result of the recognition, the first server SV1 may transmit the identification mark corresponding to the second speech to the controller 110. Alternatively, when the leaning network model is stored in the storage 130, the controller 110 may recognize the identification mark corresponding to the second speech by applying the second speech, which is converted into the digital speech signal, to the learning network model stored in the storage 130.

When the identification mark is recognized through the learning network model, the controller 110 may display at least one piece of food purchase information represented by the identification mark 312 on the display 120.

Figure 11B:
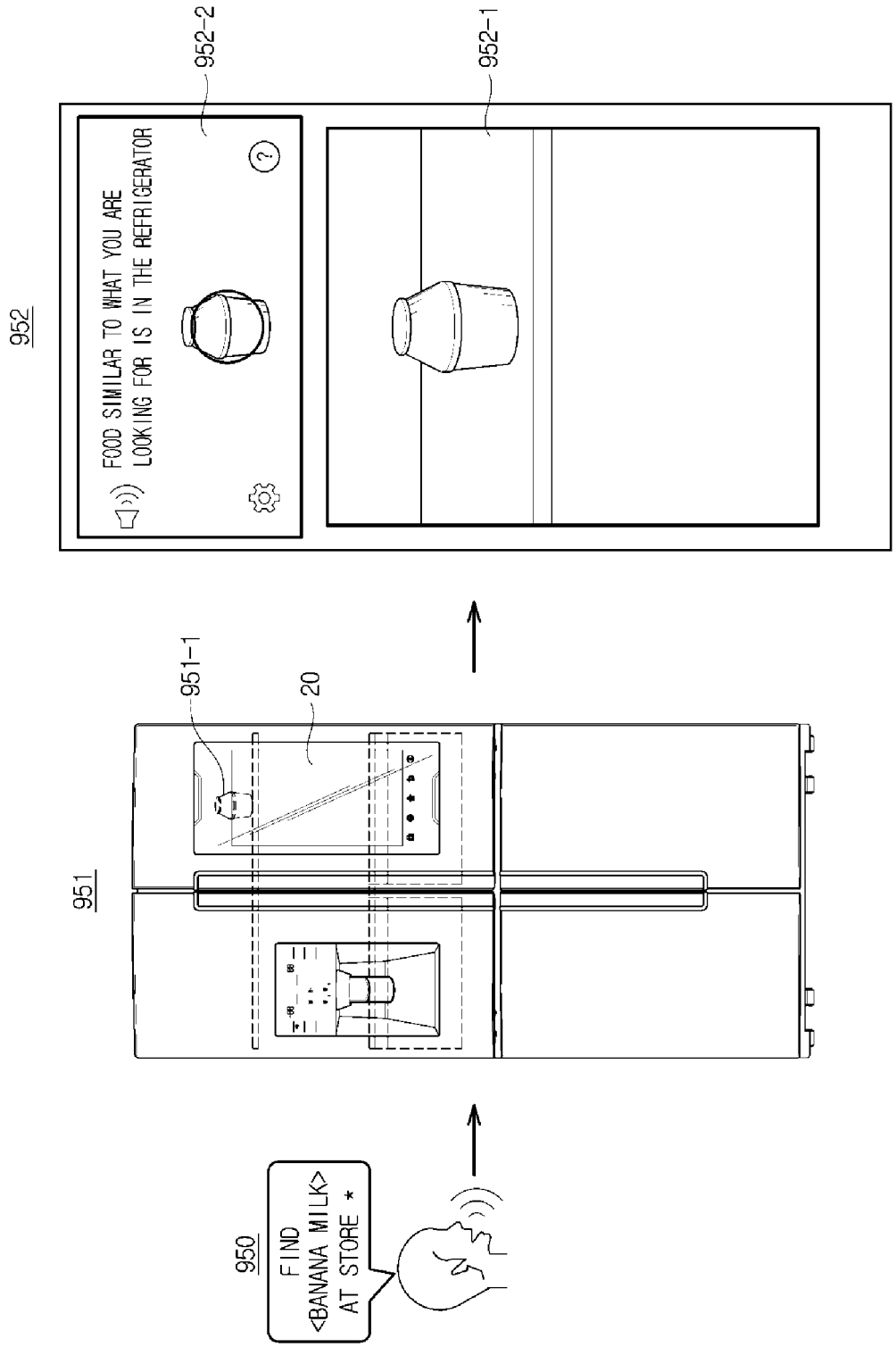

FIG. 11B is a view illustrating a method for a user to purchase food through a refrigerator according to another embodiment of the present disclosure.

As illustrated in FIG. 11B, a speech for ordering a certain food may be input via a microphone 182 (950).

A controller 110 may recognize a first speech including a food name. As described above, the controller 110 may recognize the first speech by applying the first speech, which is input through the microphone 182, to the learning network model that is trained using the artificial intelligence algorithm.

Based on the first speech being recognized, the controller 110 may identify whether a food 951-1, which is related to the food name corresponding to the first speech, is placed in the storage compartment 20 (951). The food related to the food name may be a food having a food name as at least a part of the name, or a food having the name similar with the food, or a food substitutable to the food.

For example, the refrigerator 1 may store storage information list, which includes the name of the foods placed in the storage compartment 20, in the storage 130. For example, the food name of the storage information list may be generated by the user input, when the user stores the food in the storage compartment 20 of the refrigerator 1. Particularly, information, which is input in the speech or in the text by the user, may be stored as the food names. Alternatively, the food name contained in the identification information may be stored as the food name by tagging the identification information of the food (e.g., bar code) by the user. Alternatively, the food names may be generated by recognizing an image of the storage compartment 10 captured by the camera installed in the refrigerator 1. For example, the refrigerator 1 may recognize the food name by applying the image, which is captured by the camera, to the learning network model, which is trained using the artificial intelligence algorithm, and store the recognized food name.

The refrigerator 1 may search for whether the food name corresponding to the first speech is on the storage information list, and identify whether a food related to the food name is placed in the storage compartment 20.

When it is identified that the food 951-1 related to the food name is placed in the storage compartment 20 based on the result of identification of whether the food 951-1 related to the food name corresponding to the first speech is placed in the storage compartment 20, the controller 110 may allow the display 120 to display information indicating the presence of the food 951-1 (952). Information indicating the presence of the food may include at least one of a video or image 952-1, which is acquired by capturing the food, a notification text 952-2 (e.g., "food similar to what you are looking for is in the refrigerator") indicating the presence of the food, or a notification sound indicating the presence of the food.

On the other hand, the user may want to order additional food. For example, on the display 120 on which the information indicating the presence of the food 951-1 is displayed, an UI (not shown) for ordering an additional food may be displayed together. In response to the user input for selecting the UI (not shown), the controller 110 may allow the display 120 to display the food list 300, as illustrated in FIG. 11A.

Figure 11C:
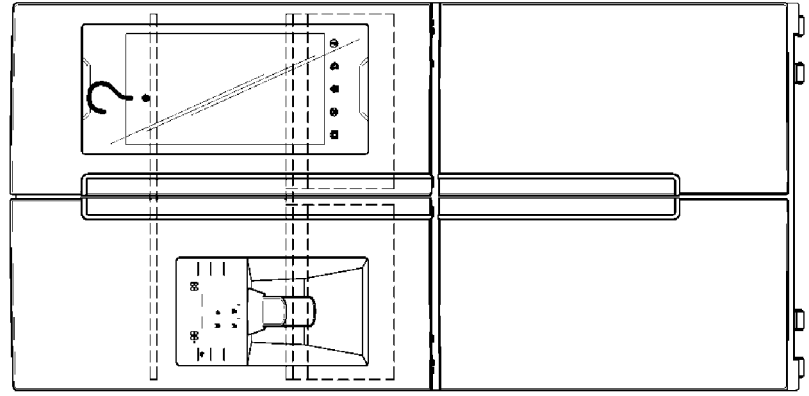
Figure 11C:
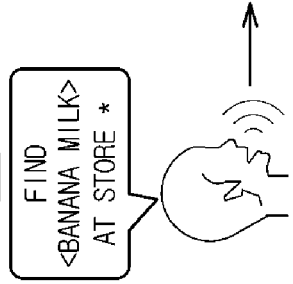

FIG. 11C is a view illustrating a method for a user to purchase food through a refrigerator according to yet another embodiment of the present disclosure.

As illustrated in FIG. 11C, a speech for ordering a certain food may be input via a microphone 182 (960).

A controller 110 may recognize a first speech including a food name. As described above, the controller 110 may recognize the first speech by applying the first speech, which is input through the microphone 182, to the learning network model that is trained using the artificial intelligence algorithm.

Based on the first speech being recognized, the controller 110 may identify whether a food, which is related to the food name corresponding to the first speech, is placed in a storage compartment 20 (961). For example, the controller 110 may identify whether a food related to the food name is placed in the storage compartment 20, based on image of the storage compartment 20 captured by the camera installed in the refrigerator 1. Alternatively, storage information list about the foods placed in the storage compartment 20 may be stored in the storage 130 of the refrigerator 1. In this case, the refrigerator 1 may search for whether the food name is on the storage information list, and identify whether the food related to the food name is placed in the storage compartment 20.

When it is identified that the food related to the food name is not placed in the storage compartment 20 based on the result of identification of whether the food related to the food name corresponding to the first speech is placed in the storage compartment 20, the controller 110 may display a food list 962-1 including food information having a name corresponding to the food name and a mark for identifying the food information, on the display 120 in order to purchase the food (962). The food list 962-1 may be displayed in the card type UI at the bottom of the speech recognition UI.

Figure 11D:
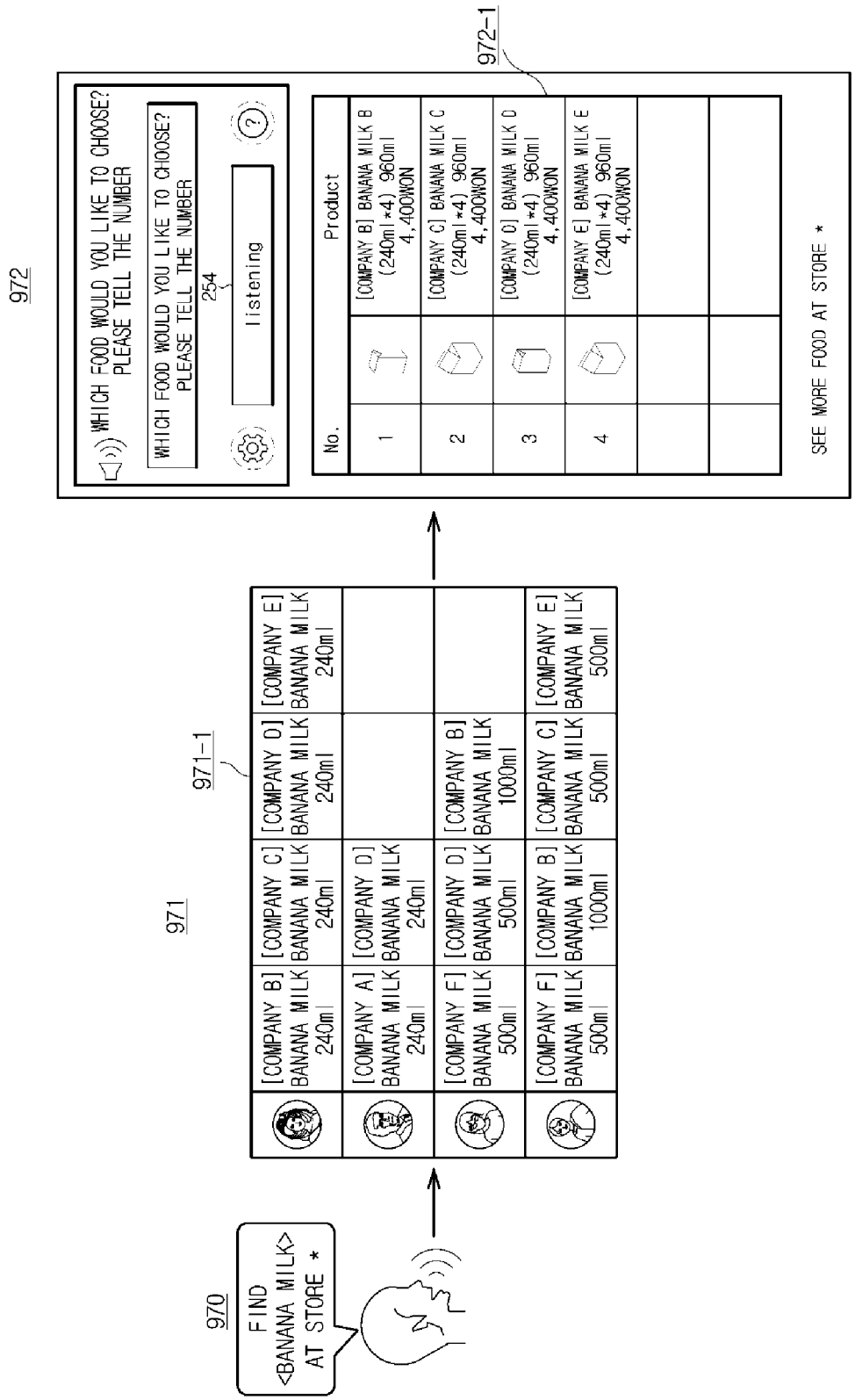

FIG. 11D is a view illustrating a method for a user to purchase food through a refrigerator according to yet another embodiment of the present disclosure.

As illustrated in FIG. 11D, a speech for ordering a certain food may be input via a microphone 182 (970).

The controller 110 may recognize a first speech including a food name. As described above, the controller 110 may recognize the first speech by applying the first speech, which is input through the microphone 182, to the learning network model that is trained using the artificial intelligence algorithm. In addition, the controller 110 may recognize a user uttering the first speech by applying the first speech, which is input through the microphone 182, to the learning network model that is trained using the artificial intelligence algorithm, and acquire user information on the user uttering the first speech.

For example, when the leaning network model is stored in the first server SV1, the controller 110 may transmit the first speech, which is converted into the digital speech signal, to the first server SV1. The first server SV1 may recognize (or estimate, infer, predict, identify) the user uttering the first speech by applying the first speech as an input value to the learning network model that is trained using the artificial intelligence algorithm. The first server SV1 may transmit the user information on the user uttering the first speech to the controller 110.

Alternatively, when the leaning network model is stored in the storage 130, the controller 110 may recognize the user uttering the first speech by applying the first speech, which is converted into the digital speech signal, to the learning network model stored in the storage 130.

When the food name and the user information are acquired based on the result of the learning network model, the controller 110 may acquire food information preferred by the user uttering the first speech related to the food name (971). For example, when a large number of users use the refrigerator 1, each user may have their own preferred food depending on the manufacturer of the food, the type of food, the capacity of the food, and the place where the food is sold even the foods have the same name. Accordingly, the storage 130 of the refrigerator 1 may store a user-specific food information list 971-1 in which information of preferred food for each user is registered with respect to the same name food. The user-specific food information may be determined based on a purchase history about the purchase by each user, an input history directly registered by the user, and food information history corresponding to the identification mark selected from the identification marks corresponding to the food name. In addition, the user-specific food information list may store the food information according to the priority preferred for each user. For example, the food information, in which the priority is selected in order of the user's purchase history when a higher priority is given to large purchase history, may be stored.

The controller 110 may acquire the food information preferred by a specific user based on the food information list stored in the storage 130 (971). Alternatively, the controller 110 may acquire the food information preferred by a specific user by applying the food name and the user information to the learning network model that is trained using the artificial intelligence algorithm. In this case, the learning network model may be a learning network model that is trained by using the above mentioned purchase history, input history, and food information history corresponding to the selected identification mark.

When the food name and the food information, which is preferred by the user uttering the first speech, are acquired, the controller 110 may display a food list 972-1 including the information of the food preferred by the user and an identification mark for distinguishing the food from other food preferred by the user, on the display 120. On the food list 972-1, the information of the food preferred by the user may be arranged in order of the user preference.

Figure 12:
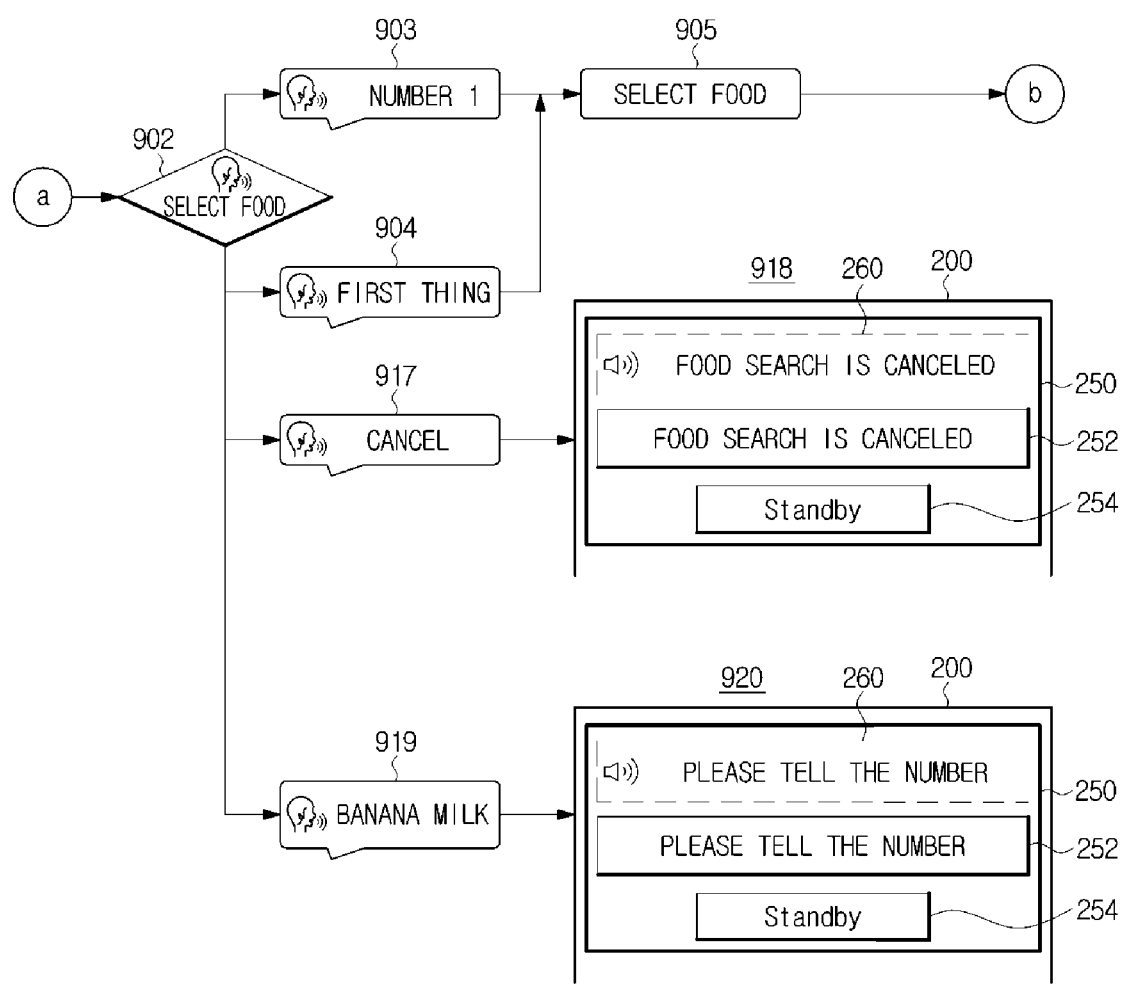

As illustrated in FIG. 12, the user can utter a speech for selecting a certain food in response to a speech for requesting confirmation for selecting a food among foods contained in the food list (902). For example, the user can utter an identification mark for distinguishing foods, as a speech.

In order to select the first food on the food list, the user may select the identification mark by uttering "number 1" or "first thing" (903 and 904).

The controller 110 may analyze the user speech through the speech recognition function. As illustrated in FIG. 10, the controller 110 may transmit the user speech data to the first server SV1 and receive the analyzed information of the speech data from the first server SV1, thereby identifying the user intention. Alternatively, the controller 110 of the refrigerator 1 itself may analyze the user speech using the speech recognition function and identify the user intention.

Figure 13:
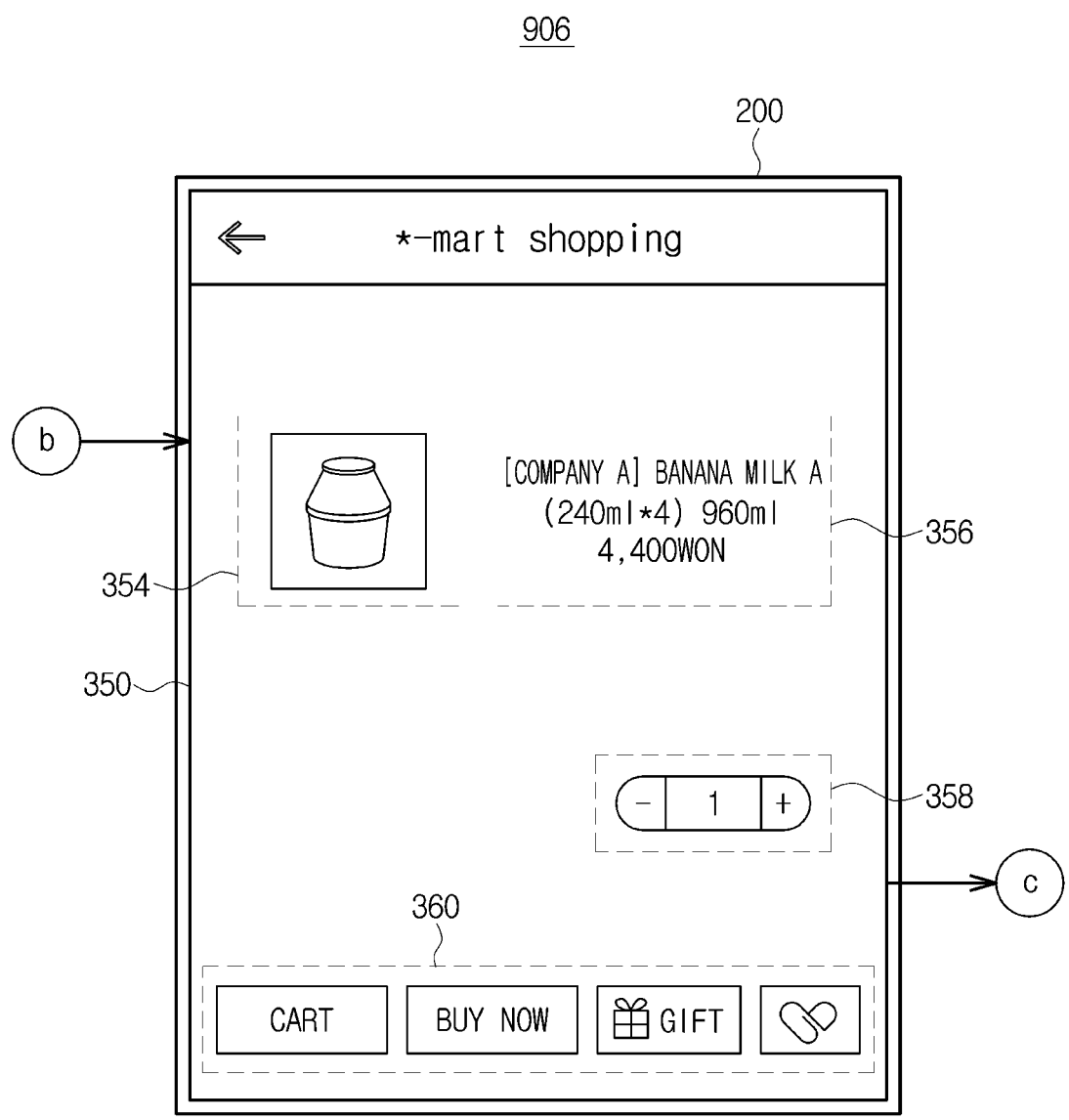

The controller 110 may search for the food name corresponding to the identification mark uttered by the user (905), and display the searched food. As illustrated in FIG. 13, the controller 110 may execute the store application and display an UI including purchase information for purchasing the selected food, on the display 120 (906).

The controller 110 may output the analyzed information of the user speech data to the store application through the method illustrated in FIG. 11 and when receiving the food information from the second server SV2, the controller 110 may display the UI on the display 120 by executing the store application, as illustrated in FIG. 13.

Referring to FIG. 13, a food confirmation UI 350 indicating specific information on a food selected by the user may be displayed. The food confirmation UI may include a representative image region 354 representing a food, a food information area 356 including a manufacturer, a food name, a capacity, a quantity and a price, a quantity control area 358 for controlling the quantity of food, and a food purchase area 360 including a cart tab for putting a food in the cart, a buy now tab for immediately purchasing a food, a gift tab for presenting a food, and a tab for bookmarking the selected food. The number and arrangement of areas contained the food purchase UI, as illustrated in FIG. 13 is merely an example and thus may include other numbers, arrangements, or other contents.

Figure 14:
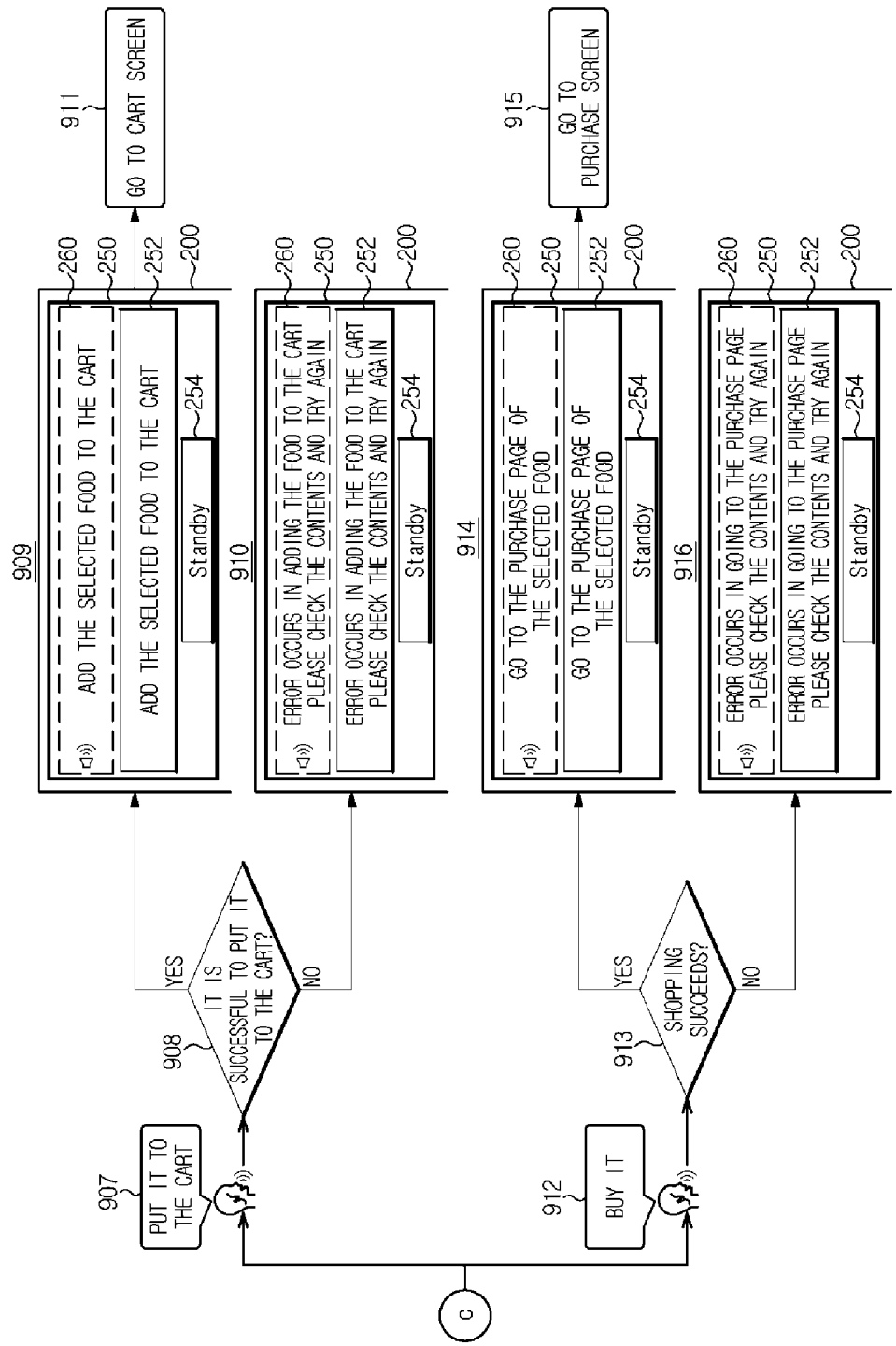

As illustrated in FIG. 14, the user may say "put it to the cart" to put the food, which is displayed on the food confirmation UI, in the cart (907). The user may say "buy it" to immediately purchase the food, which is displayed on the food confirmation UI (912).

When a function of putting the food to the cart is performed normally in response to the user utterance "put it to the cart" (yes in 908), the controller 110 may display the speech recognition UI on the display 120 and display a text "add the selected food to the cart" on the speech recognition UI, as illustrated in FIG. 14 (909). In addition, the controller 110 may output the text, which is displayed on the speech recognition UI, via the speaker 181 by a speech using the TTS function. The speech recognition UI may be displayed in the card type UI on the store application screen.

When the text and the speech indicating that the food is added normally to the cart is output, the store application may display a cart screen on the display 120 (911).

When an error occurs in the function that is to put the food to the cart in response to the user utterance "put it to the cart", (no in 908), the controller 110 may display the speech recognition UI on the display 120 and display a text "an error occurs in adding the food to the cart. Please check the contents and try again" on the speech recognition UI, as illustrated in FIG. 14 (910). In addition, via the speaker 181, the controller 110 may output the text, which is displayed on the speech recognition UI, as a speech using the TTS function. In this case, the user may say again "put it to the cart" to add the food to the cart again.

When the function of purchasing food immediately in response to the user's utterance "buy it" is performed normally (yes in 913), the controller 110 may display the speech recognition UI on the display 120 and display a text "go to the purchase page of the selected food" on the speech recognition UI (914). In addition, via the speaker 181, the controller 110 may output the text, which is displayed on the speech recognition UI, as a speech using the TTS function. The speech recognition UI may be displayed in the card type UI on the store application screen.

When the text and the speech indicating that the page goes to the food purchase page is output since the function of purchasing food immediately is performed normally, the store application may display the food purchase screen on the display 120 (915).

When an error occurs in the function that is to purchase food immediately in response to the user utterance "buy it", (no in 913), the controller 110 may display the speech recognition UI on the display 120 and display a text "an error occurs in going to the purchase page. Please check the contents and try again" on the speech recognition UI, as illustrated in FIG. 14 (916). In addition, via the speaker 181, the controller 110 may output the text, which is displayed on the speech recognition UI, as a speech using the TTS function. In this case, the user may say again "buy it" to purchase the food again.

Meanwhile, as illustrated in FIG. 12, the user may say "cancel" when the user does not want to select the food contained the food list or the user wants to cancel the food purchase process (917).

In response to the user utterance "cancel", the controller 110 may display the speech recognition UI on the display 120 and display a text "food search canceled" on the speech recognition UI (918). In addition, via the speaker 181, the controller 110 may output the text, which is displayed on the speech recognition UI, as a speech using the TTS function. The speech recognition UI may be displayed in the card type UI on the store application screen.

Further, as illustrated in FIG. 12, the user can say the food name not the identification mark (919). When a food having the same name is present in foods contained in the food list or when the user says wrong food name, the food selected by the user may be not identified. In this case, as illustrated in FIG. 12, in response to the user utterance, the controller 110 may display the speech recognition UI on the display 120 and display a text "please tell the number" on the speech recognition UI (920). In addition, via the speaker 181, the controller 110 may output the text, which is displayed on the speech recognition UI, as a speech using the TTS function.

As described above, in response to the user utterance, the controller 110 may not immediately execute the application, but provide information in the card type UI first and when certain information in the information, which is provided in the card type UI, is selected, the controller 110 may execute the related application.

Figure 15:
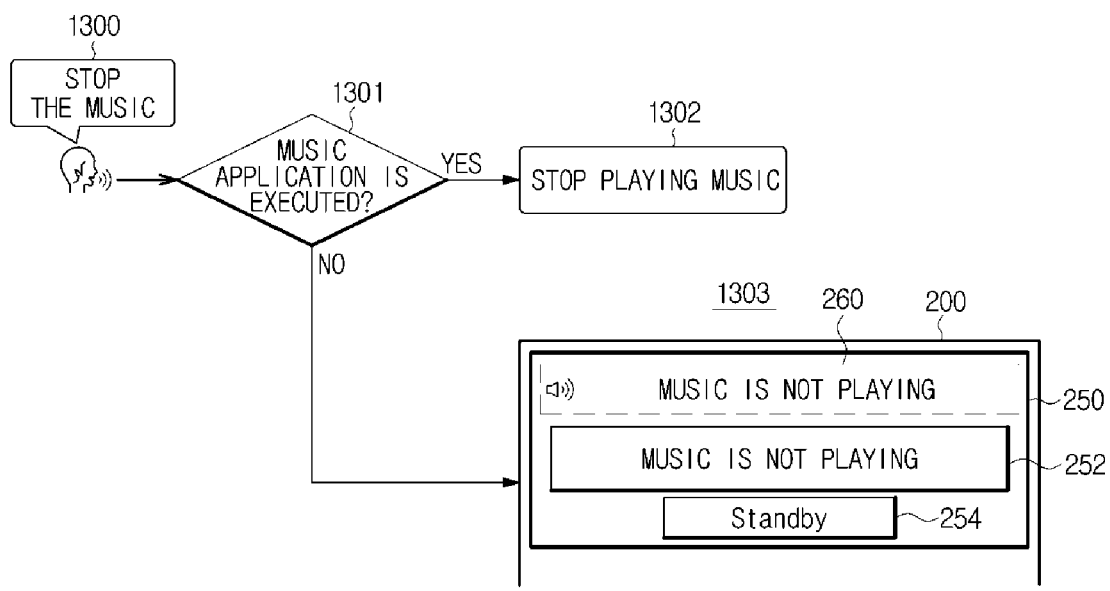
FIGS. 15 and 16 are views illustrating a method in which the refrigerator according to one embodiment of the present disclosure performs a command in accordance with a speech command.
Figure 16:
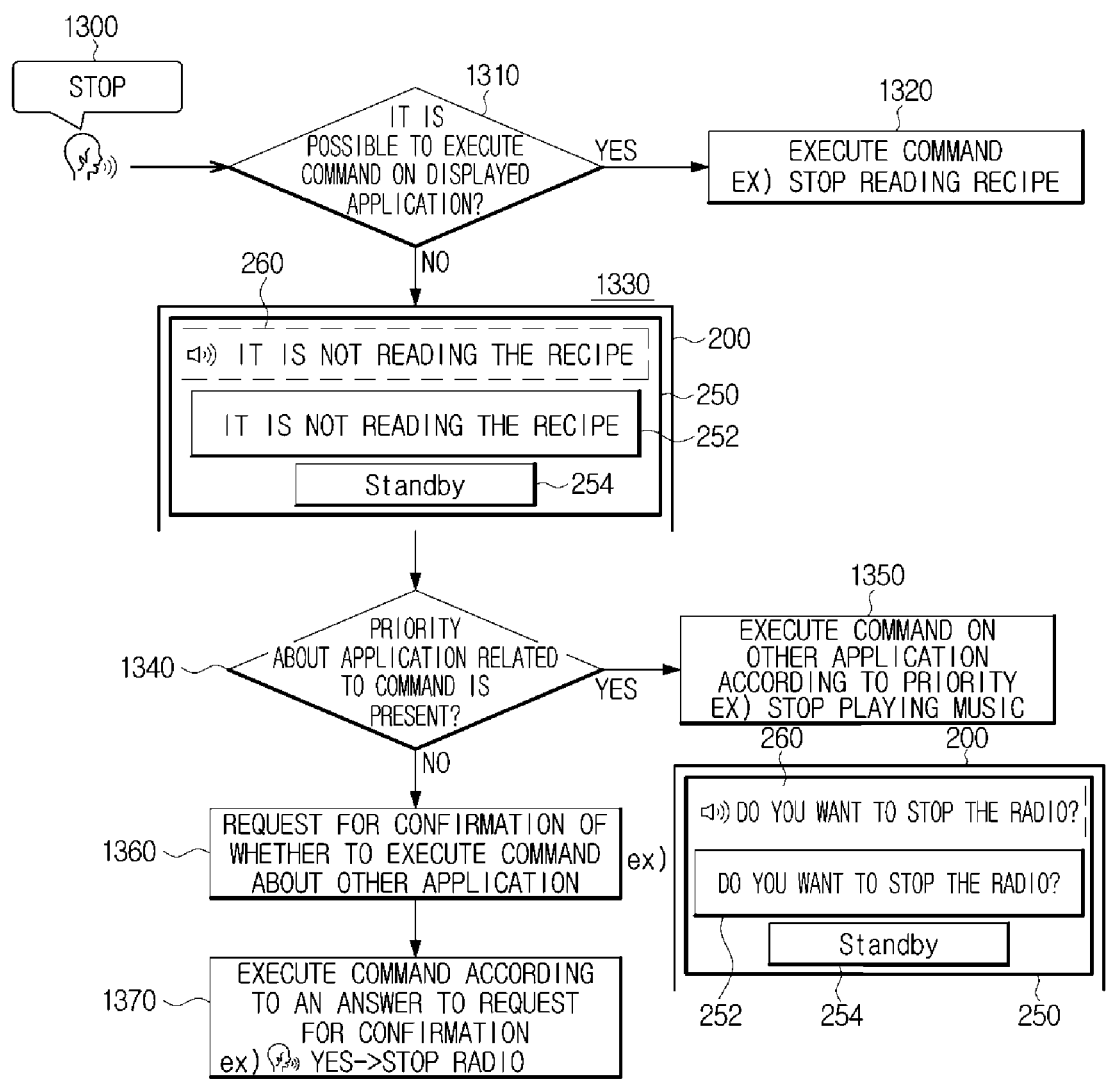

FIGS. 15 and 16 are views illustrating a method in which the refrigerator according to one embodiment of the present disclosure performs a command in accordance with a speech command.

When the user utters a speech about a specified target for executing a speech command, the controller 110 of the refrigerator 1 may perform a command corresponding to the speech command, as illustrated in FIG. 15.

As illustrated in FIG. 15, when a speech "stop the music" is input via the microphone 182 (1300), the controller 110 of the refrigerator 1 may analyze the user speech through the speech recognition function, thereby identifying the user intention. The controller 110 of the refrigerator 1 may analyze the user speech through the speech recognition function. Alternatively, the controller 110 of the refrigerator 1 may transmit the user speech data to the first server SV1 and receive the analyzed information of the speech data from the first server SV1.

Based on the user intention being identified as "stopping the music", the controller 110 of the refrigerator 1 may identify whether the music application is executed that is the music is played (1301). When the music is played, the controller 110 may immediately stop playing the music (1302).

When the music is not played, the controller 110 may display the speech recognition UI on the display 120 and display a text "music is not playing" on the speech recognition UI (1303). In addition, via the speaker 181, the controller 110 may output the text, which is displayed on the speech recognition UI, as a speech using the TTS function.

A speech command in which the target is not specified may be input via the microphone 182, which is different from the example of FIG. 15. That is, as illustrated in FIG. 16, a speech "stop", in which the target of the command is omitted, may be input via the microphone 182 (1300).

When the speech "stop" without the target of the command, may be input via the microphone 182, the controller 110 of the refrigerator 1 may analyze the user speech through the speech recognition function, thereby identifying the user intention. The controller 110 of the refrigerator 1 may analyze the user speech through the speech recognition function. Alternatively, the controller 110 of the refrigerator 1 may transmit the user speech data to the first server SV1 and receive the analyzed information of the speech data from the first server SV1.

When the target of the command is not contained in the speech input via the microphone 182, the controller 110 may identify whether the controller is capable of performing the speech command on the application displayed on the display 120 which is currently executed (1310).

When the controller 110 is capable of performing the speech command on the application displayed on the display 120 which is currently executed, the controller 110 may perform the speech command on the application displayed on the display 120 (1320).

For example, when the recipe application is currently displayed on the display 120 and the speech reading the recipe is output via the speaker 181, the controller 110 may immediately stop the function in which the recipe applications reads the recipe.

In other words, when the speech command without the target of the command is input, the controller 110 may identify whether to perform the command on the application displayed on the display 120, which is currently executed, as the first priority.

When the controller 110 is not capable of performing the speech command on the application displayed on the display 120 which is currently executed, the controller 110 may display the speech recognition UI on the display 120, thereby notifying that it is impossible to perform the speech command (1330).

That is, as illustrated in FIG. 16, the controller 110 may display the speech recognition UI on the display 120 and display a text "not reading the recipe" on the speech recognition UI. In addition, via the speaker 181, the controller 110 may output the text, which is displayed on the speech recognition UI, as a speech using the TTS function.

When the controller 110 notifies that it is impossible to perform the speech command on the application displayed on the display 120, through the speech recognition UI, the controller 110 may identify whether a predetermined priority about the application related to the input speech command is present (1340). When the predetermined priority is present, the controller 110 may perform the speech command on the application according to the priority (1350).

For example, according to the priority, the controller 110 may perform the speech command on the application ranked in the highest priority, and when it is impossible to perform the speech command on the application having the highest priority, the controller 110 may perform the speech command on the application ranked in the next highest priority.

When the music application is ranked in the highest priority in the priority order of the application related to the speech command "stop", the controller 110 stops playing the music being played by the music application. When the music is not playing, the controller 110 may identify whether to perform the application ranked in the next highest priority. Accordingly, the controller 110 may perform the speech command on the application in order of the highest priority.

When the predetermined priority about the application related to the input speech command is not present, the controller 110 may request a confirmation about whether to perform the speech command on other application (1360).

As described above, when the function of reading the recipe is not executed although the recipe application is displayed on the display 120, the controller 110 may identify whether to perform the speech command on other application.

When the radio application is currently executed on the background, the controller 110 may select the radio application as the target of the speech command, as illustrated in FIG. 16, and before executing the speech command on the radio application, the controller 110 may display the speech recognition UI and request confirmation about whether to execute the speech command.

That is, as illustrated in FIG. 16, the controller 110 may display the speech recognition UI on the display 120 and display a text "do you want to stop the radio" on the speech recognition UI. In addition, via the speaker 181, the controller 110 may output the text, which is displayed on the speech recognition UI, as a speech using the TTS function.

When an answer to the confirmation request is input via the microphone 182, the controller 110 performs a command according to the input answer (1370).

For example, when a positive answer (e.g., "yes") to the confirmation request "do you want to stop the radio" is input, the controller 110 stops the execution of the radio application.

As described above, although the target of the command is omitted in the speech command, the refrigerator 1 according to one embodiment may perform the command meeting the user intention using the method illustrated in FIG. 16.

FIGS. 17 to 20 are views illustrating a method in which the refrigerator according to one embodiment of the present disclosure identifies a user and provides information corresponding to the identified user.

Figure 17:
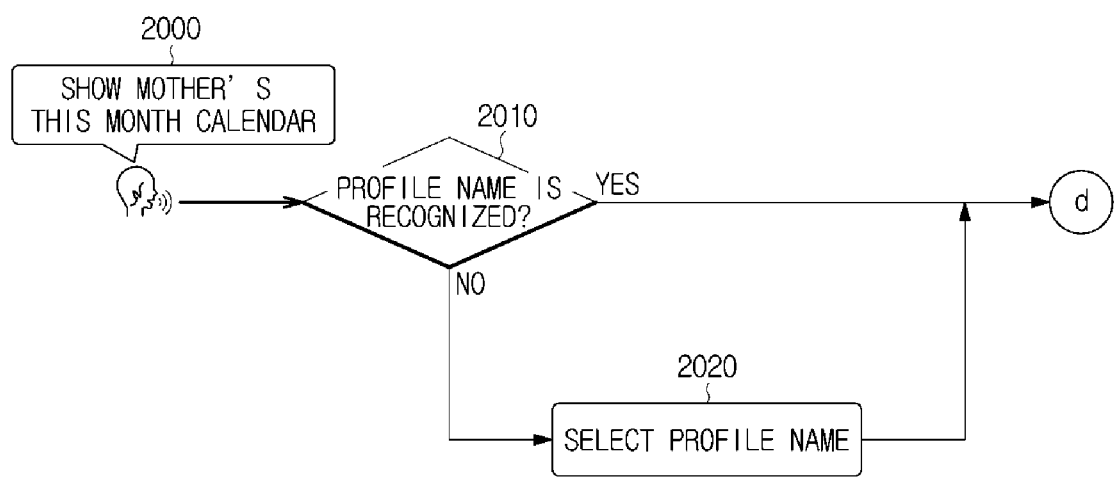
FIGS. 17 to 20 are views illustrating a method in which the refrigerator according to one embodiment of the present disclosure identifies a user and provides information corresponding to the identified user.
Figure 18:
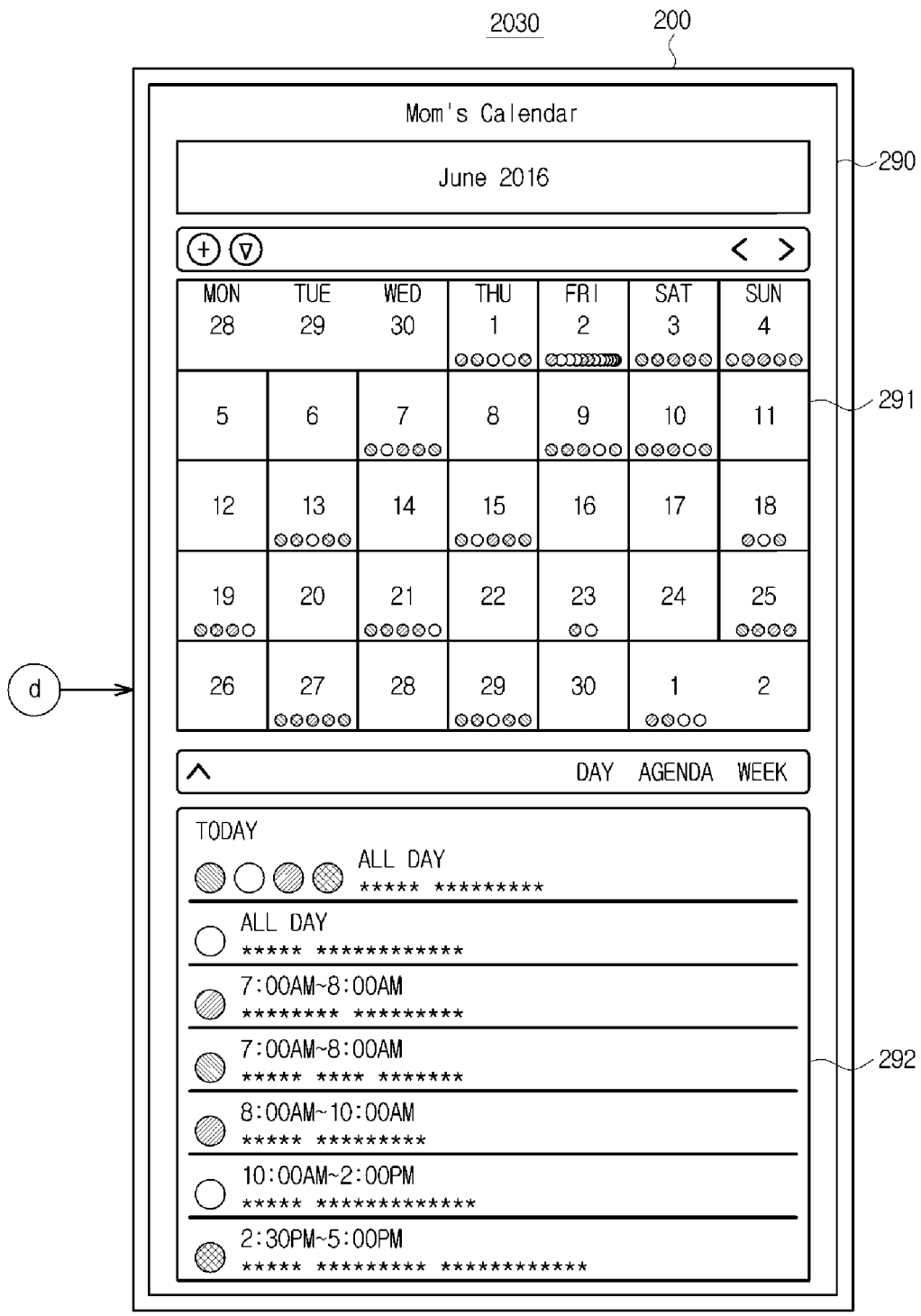
Figure 19:
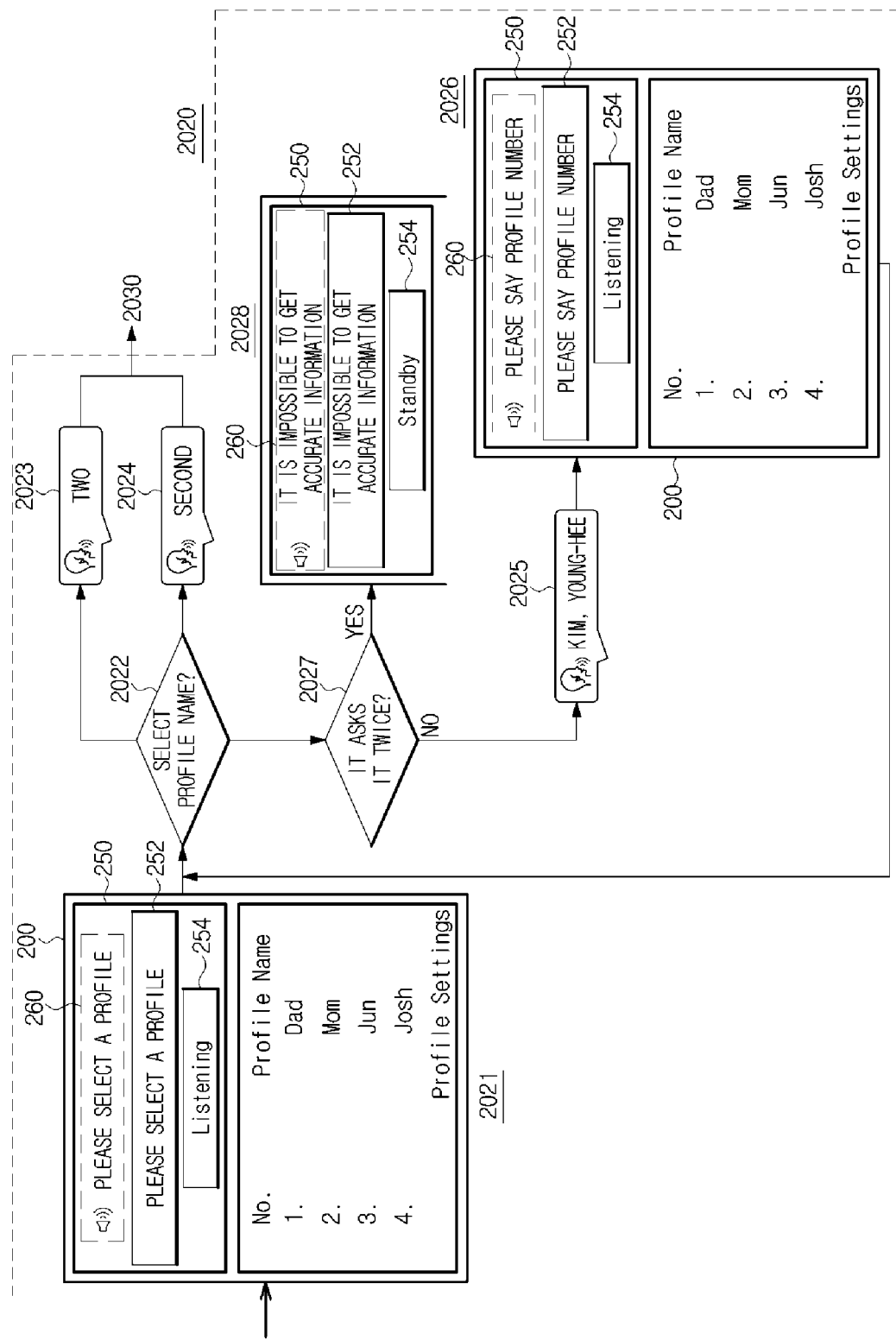

As illustrated in FIGS. 17 to 19, the user can refer to a specific user, and the user may ask to provide information related to the specific user.

As illustrated in FIG. 17, when a speech "show mother's this month calendar" is input via the microphone 182 (2000), the controller 110 of the refrigerator 1 may analyze the user speech through the speech recognition function, thereby identifying the user intention.

The controller 110 of the refrigerator 1 may analyze the user speech through the speech recognition function. Alternatively, the controller 110 of the refrigerator 1 may transmit the speech data to the first server SV1 and receive the analyzed information of the speech data from the first server SV1.

The calendar application has been described as an application capable of providing user-specific information, but the application is not limited to the calendar application. Therefore, the speech output setting application (which is referred to as "morning brief" in FIG. 5) capable of outputting contents, which are specified for the user, as a speech, may provide user-specific information according to methods illustrated in FIGS. 17 to 20.

The controller 110 of refrigerator 1 may identify the user intention contained in the speech by recognizing the user name contained in the speech, and perform the command according to the speech. That is, when it is identified that the user intention is to show a calendar of a mother among a plurality of users, particularly, this month calendar among the mother's calendars, the controller 110 displays mother's this month calendar 290 on the display 120 by executing the calendar application, as illustrated in FIG. 18 (2030).

As illustrated in FIG. 18, a calendar provided from the calendar application may include a calendar part 291 on which date and day of the week are displayed, and a schedule part 292 on which today's schedule is displayed. The configuration of the calendar illustrated in FIG. 18 is merely an example and thus the configuration and arrangement of the calendar may have a variety of shapes.

When the controller 110 of the refrigerator 1 fails to recognize the name of a specific user contained in the speech, the controller 110 performs a process of selecting a specific user among the stored users (2020).

When the controller 110 of the refrigerator 1 fails to recognize the name of the specific user contained in the speech, the controller 110 of the refrigerator 1 may display the speech recognition UI on the display 120 and then display a text "please select a profile" on the speech recognition UI (2021). In addition, via the speaker 181, the controller 110 may output the text, which is displayed on the speech recognition UI, as a speech using the TTS function. The controller 110 may display a user profile list, which is pre-registered in the refrigerator 1, together with the speech recognition UI.

The profile list includes registered user names and identification mark for identifying each user name. As illustrated in FIG. 19, the identification mark may be displayed in figures, but is not limited thereto. Because a mark capable of distinguishing a plurality of users from each other is sufficient to be the identification mark, the identification mark may be displayed in figures or characters.

As illustrated in FIG. 19, the user can utter a speech for selecting a specific user in response to a speech for requesting confirmation for selecting a user among users contained in the profile list (2022). For example, the user can utter an identification mark, in a speech.

In order to select a second user on the profile list, the user may select the identification mark by uttering "two" or "second" (2023 and 2024).

The controller 110 may analyze the user speech through the speech recognition function. As illustrated in FIG. 10, the controller 110 may transmit the user speech data to the first server SV1 and receive the analyzed information of the speech data from the first server SV1, thereby identifying the user intention. Alternatively, the controller 110 of the refrigerator 1 itself may analyze the user speech using the speech recognition function and identify the user intention.

The controller 110 may select a user name corresponding to the identification mark uttered by the user, and display the selected user's calendar on the display 120. That is, the controller 110 selects a user corresponding to "two" or "second" uttered by the user, as a mother, and as illustrated in FIG. 18, displays the mother's this month calendar on the display 120 (2030).

In addition, the user can utter the user name, not the identification mark (2025).

When the user utters an incorrect user name or a different expression irrelevant to the user name, the profile selected by the user may not be identified. In such a case, the controller 110 may display the speech recognition UI on the display 120 in response to the user utterance, and display a text "say the profile number" on the speech recognition UI (2026). In addition, via the speaker 181, the controller 110 may output the text, which is displayed on the speech recognition UI, as a speech using the TTS function.

When the controller 110 asks the request for selecting the profile more than twice (2027), the controller 110 may display the speech recognition UI on the display 120 and display a text "it is impossible to get accurate information" on the speech recognition UI, as illustrated in FIG. 19 (2028). In addition, via the speaker 181, the controller 110 may output the text, which is displayed on the speech recognition UI, as a speech using the TTS function.

Although not shown in the drawing, when the user does not want to select a user contained in the profile list, or wants to cancel the calendar display itself, the user can say "cancel". The controller 110 may display the speech recognition UI on the display 120 in response to the user utterance, and display a text "it is canceled" on the speech recognition UI. In addition, via the speaker 181, the controller 110 may output the text, which is displayed on the speech recognition UI, as a speech using the TTS function.

Figure 20:
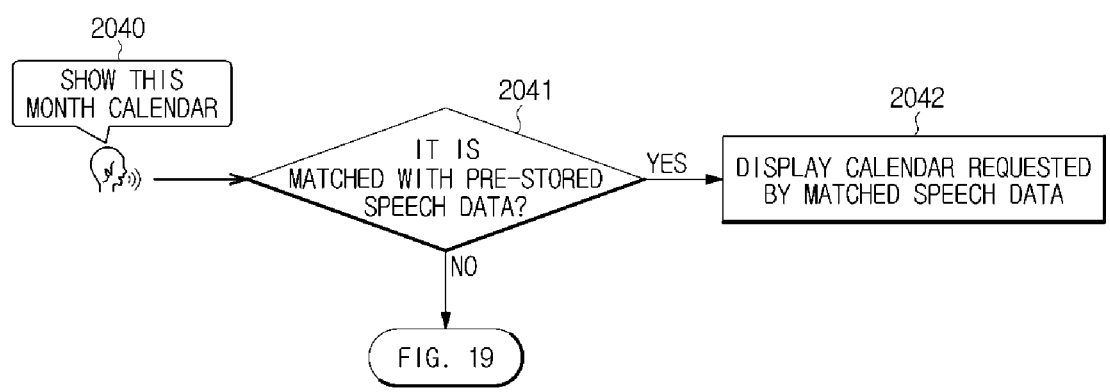

As illustrated in FIG. 20, without referring to a specific user, the user may ask to provide information, which is stored differently for each user.

As illustrated in FIG. 20, when a speech "show this month calendar" is input via the microphone 182 (2040), the controller 110 of the refrigerator 1 may analyze the user speech through the speech recognition function, thereby identifying the user intention. The controller 110 of the refrigerator 1 may analyze the user speech through the speech recognition function. Alternatively, the controller 110 of the refrigerator 1 may transmit the speech data to the first server SV1 and receive the analyzed information of the speech data from the first server SV1.

When an expression indicating the specific user is not contained in the speech data, the controller 110 of the refrigerator 1 compares the speech data with speech data of the users, which is stored in advance, and identifies whether speech data matching with the speech data is present the pre-stored speech data (2041).

The controller 110 of the refrigerator 1 compares parameters of the speech data, such as the amplitude, waveform, frequency or period, which is input via the microphone 182, with parameters of the pre-stored speech data, and selects speech data, which is identified as to be identical to the speech data input via the microphone 182, among the pre-stored speech data.

When it is identified that speech data, which is identified to be matched with the speech data input via the microphone 182, is present among the pre-stored speech data, the controller 110 may display a user's calendar indicated by the selected speech data, on the display 120 (2042). For example, when it is identified that the matched speech data among the pre-stored speech data is the mother, the controller 110 may display the mother's this month calendar on the display 120.

When it is identified that speech data, which is identified to be matched with the speech data input via the microphone 182, is not present among the pre-stored speech data (no in 2041), the controller 110 of the refrigerator 1 may display the speech recognition UI on the display 120 and then display a text "please select a profile" on the speech recognition UI as illustrated in FIG. 19 (2021). In addition, via the speaker 181, the controller 110 may output the text, which is displayed on the speech recognition UI, as a speech using the TTS function. The controller 110 may display a user profile list, which is pre-registered in the refrigerator 1, together with the speech recognition UI.

As illustrated in FIG. 19, the user can utter a speech for selecting a specific user in response to a speech for requesting confirmation for selecting a user among users contained in the profile list (2022). For example, the user can utter an identification mark, in a speech.

In order to select a second user on the profile list, the user may select the identification mark by uttering "two" or "second" (2023 and 2024).

The controller 110 may select a user name corresponding to the identification mark uttered by the user, and display the selected user's calendar on the display 120. That is, the controller 110 selects a user corresponding to "two" or "second" uttered by the user, as the mother, and as illustrated in FIG. 18, displays the mother's this month calendar on the display 120 (2030).

In addition, the user can utter the user name, not the identification mark (2025). When the user utters an incorrect user name or a different expression irrelevant to the user name, the profile selected by the user may not be identified. In such a case, as illustrated in FIG. 19, the controller 110 may display the speech recognition UI on the display 120 in response to the user's utterance, and display a text "say the profile number" on the speech recognition UI (2026). In addition, via the speaker 181, the controller 110 may output the text, which is displayed on the speech recognition UI, as a speech using the TTS function.

When the controller 110 asks the request for selecting the profile more than twice (2027), the controller 110 may display the speech recognition UI on the display 120 and display a text "it is impossible to get accurate information" on the speech recognition UI, as illustrated in FIG. 19 (2028). In addition, via the speaker 181, the controller 110 may output the text, which is displayed on the speech recognition UI, as a speech using the TTS function.

As described above, although the user does not utter a specific user and asks to provide information, which is stored differently for each user, the refrigerator 1 according to one embodiment may identify the user and provide information that is appropriate for the user, according to the method illustrated in FIG. 20.

Figure 21A:
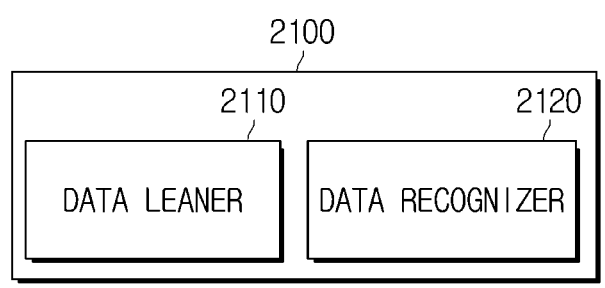
FIG. 21A is a block diagram of a controller for data training and recognition according to one embodiment of the present disclosure.

FIG. 21A is a block diagram of a controller for data training and recognition according to one embodiment of the present disclosure.

Referring to FIG. 21A, a controller 2100 may include a data leaner 2110 and a data recognizer 2120. The controller 2100 may correspond to the controller 110 of the refrigerator 1. Alternatively, the controller 2100 may correspond to a controller (not shown) of the first server SV1.

The data leaner 2110 may train a learning network model to have a criterion to recognize speech data. For example, the data leaner 2110 may train the learning network model to have criteria to recognize the food name corresponding to the first speech or the identification mark corresponding to the second speech. Alternatively, the data leaner 2110 may train the learning network model to have a criterion to recognize images. For example, the data leaner 2110 may train the learning network model to have a criterion to recognize foods stored in the storage compartment based on images captured by the storage compartment of the refrigerator 1.

The data leaner 2110 may train the learning network model (i.e., data recognition model) using training data according to a supervised learning method or an unsupervised learning method based on the artificial intelligence algorithms.

According to one embodiment, the data leaner 2110 may train the learning network model by using training data such as speech data and a text (e.g., food names and identification marks) corresponding to the speech data. Alternatively, the data leaner 2110 may train the learning network model by using training data such as speech data and user information on a user uttering the speech data. Alternatively, the data leaner 2110 may train the learning network model by using training data such as image data and a text (e.g., food names) corresponding to the image data.

The data recognizer 2120 may recognize speech data by applying speech data as feature data to the learning network model that is trained. For example, the data recognizer 2120 may recognize the food name or the identification mark corresponding to the speech data, by applying the speech data related to the first speech or the second speech, as feature data to the learning network model. The recognition result of the learning network model (i.e., data recognition model) may be used to refine the learning network model. Alternatively, the data recognizer 2120 may recognize the user uttering the speech data by applying the speech data as feature data to the learning network model.

Further, the data recognizer 2120 may recognize image data by applying image data, which is acquired by capturing the storage compartment 20, as feature data to the learning network model that is trained. For example, the data recognizer 2120 may recognize the food name corresponding to the image data, by applying the image data as feature data to the learning network model.

At least one of the data leaner 2110 and the data recognizer 2120 may be manufactured as at least one hardware chip and then mounted to an electronic device. For example, at least one of the data leaner 2110 and the data recognizer 2120 may be manufactured in the form of a dedicated hardware chip for artificial intelligence (AI) or manufactured as a part of a conventional general purpose processor (e.g., CPU or application processor) or a dedicated graphics processor (e.g., GPU) and then mounted to the above mentioned electronic device. At this time, the dedicated hardware chip for the artificial intelligence is a dedicated processor specialized for probability calculation, and it has a higher parallel processing performance than conventional general purpose processors and thus it can quickly process the computation in artificial intelligence such as machine learning.

In this case, the data leaner 2110 and the data recognizer 2120 may be mounted on one electronic device or on separate electronic devices, respectively. For example, one of the data leaner 2110 and the data recognizer 2120 may be contained in the refrigerator 1 and the other may be contained in the server SV1. Through the wired or wireless communication, at least a part of the learning network model constructed by the data leaner 2110 may be provided to the data recognizer 2120 and data, which is input to the data recognizer 2120, may be provided as additional training data to the data leaner 2110.

At least one of the data leaner 2110 and the data recognizer 2120 may be implemented as a software module. When at least one of the data leaner 2110 and the data recognizer 2120 is implemented as a software module (or a program module including instructions), the software module may be stored in non-transitory computer readable media. In this case, at least one software module may be provided by Operating System (OS) or a certain application. Alternatively, some of the at least one software module may be provided by the OS and the remaining some may be provided by a certain application.

Figure 21B:
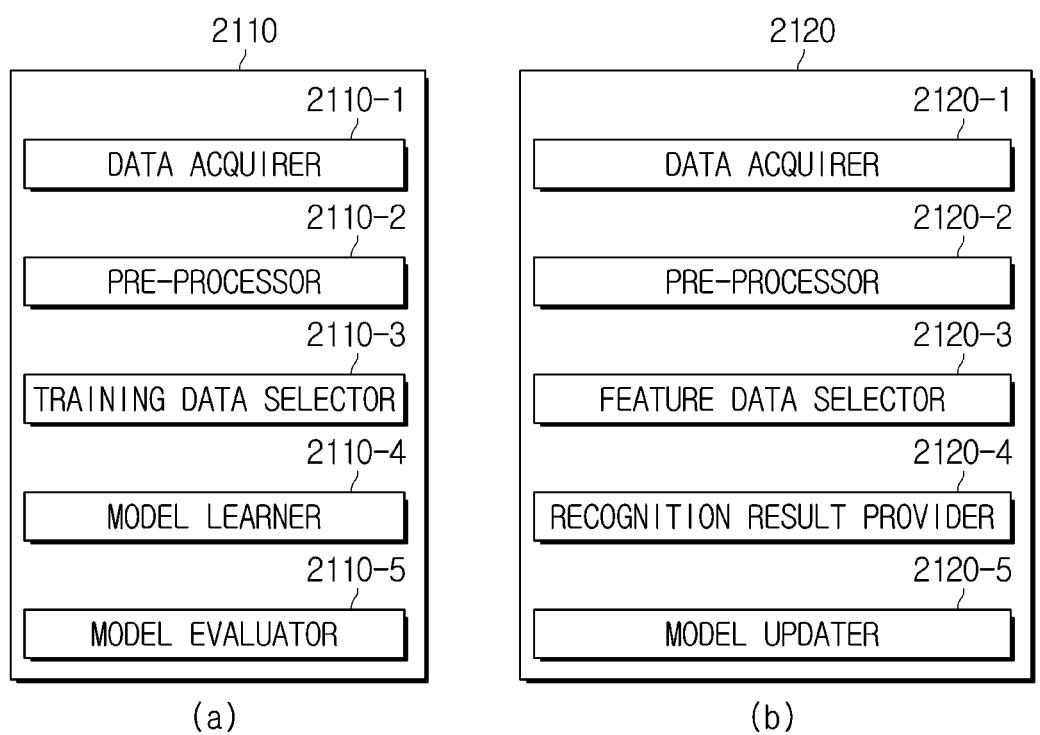
FIG. 21B is a detail block diagram of a data learner and a data recognizer according to one embodiment of the present disclosure.

FIG. 21B is a detail block diagram of the data learner 2110 and the data recognizer 2120 according to one embodiment of the present disclosure.

(a) of FIG. 21B is a block diagram of the data leaner 2110 according to one embodiment of the present disclosure.

Referring to (a) of FIG. 21B, according to one embodiment, the data learner 2110 may include a data acquirer 2110-1, a pre-processor 2110-2, a training data selector 2110-3, a model learner 2110-4 and a model evaluator 2110-5. Depending on some embodiment, the data learner 2110 may necessarily include the data acquirer 2110-1 and the model learner 2110-4, and selectively include at least one of the pre-processor 2110-2, the training data selector 2110-3, and the model evaluator 2110-5, or may not include all of the pre-processor 2110-2, the training data selector 2110-3, and the model evaluator 2110-5.

The data acquirer 2110-1 may acquire data need for learning a criterion for recognizing speech data or image data.

For example, the data acquirer 2110-1 may acquire speech data or image data. The data acquirer 2110-1 may acquire speech data or image data from the refrigerator 1. Alternatively, the data acquirer 2110-1 may acquire speech data or image data from a third device (e.g., a mobile terminal or a server) connected to the refrigerator 1 through the communication. Alternatively, the data acquirer 2110-1 may acquire speech data or image data from a device configured to store or manage training data, or a data base.

The pre-processor 2110-2 may pre-process the speech data or image data. The pre-processor 2110-2 may process the acquired speech data or image data into a predetermined format so that the model learner 2110-4, which will be described later, may use the data acquired for learning for the situation determination.

For example, the pre-processor 2110-2 may remove noises from data, such as the speech data or image data, acquired by the data acquirer 2110-1 so as to select effective data, or process the data into a certain format. Alternatively, the pre-processor 2110-2 may process the acquired data form into a form of data suitable for learning.

The training data selector 2110-3 may randomly select speech data or image data, which is needed for learning, from the pre-processed data according to the pre-determined criteria or the training data selector 2110-3 may randomly select the speech data or image data. The selected training data may be provided to the model leaner 2110-4. The pre-determined criteria may include at least one of an attribute of data, a generation time of data, a place where data is generated, an apparatus for generating data, a reliability of data, and a size of data.

In addition, the training data selector 2110-3 may select training data according to the criterion that is pre-determined by the training of the model learner 2110-4 described later.

The model learner 2110-4 may train the learning network model so as to have a criterion for recognizing speech data or image data based on the training data. For example, the model learner 2110-4 may train the learning network model so as to have a criterion for recognizing the food name or the identification mark corresponding to the speech data. For example, the model leaner 2110-4 may train the learning network model so as to have a criterion for recognizing the food stored in the storage compartment based on the image data of the storage compartment of the refrigerator 1.

In this case, the learning network model may be a model constructed in advance. For example, the learning network model may be a model that is pre-constructed by receiving basic training data (e.g., sample image data or speech data).

As a result of training of the model leaner 2110-4, the learning network model may be set to recognize (or determine, estimate, infer, predict) the food name or the identification mark corresponding to the speech. Alternatively, the learning network model may be set to recognize (or determine, estimate, infer, predict) the user uttering the speech. Alternatively, the learning network model may be set to recognize (or determine, estimate, infer, predict) the food stored in the storage compartment based on the image data.

The learning network model may be a model based on a neural network. The learning network model may be designed to mimic the human brain structure on a computer. The learning network model may include a plurality of network nodes having weights to mimic the neuron of the neural network. The plurality of network nodes may form the respective connection to mimic the synaptic activity of neuron that sends and receive a signal through the synapses. For example, the learning network model may include a neural network model or a deep learning model developed from the neural network model. The plurality of network nodes may be placed in different depth (or, layers) in the deep learning model and send and receive data according to the convolution connection. For example, a deep neural network (DNN), a recurrent neural network (RNN), or a bicommandal recurrent deep neural network (BRDNN) may be used as the learning network model, but is not limited thereto.

According to various embodiments, when a plurality of pre-constructed learning network model is present, the model learner 2110-4 may select a learning network model, which is closely related to input training data and basic training data, as a learning network model to be trained. For example, the model learner 2110-4 may train the learning network model by using the learning algorithm including error back-propagation method or gradient descent method. Alternatively, the model learner 2110-4 may train the learning network model through the supervised learning method using an input value as the training data. Alternatively, the model learner 2110-4 may allow the learning network model to learn through the unsupervised learning method, and the unsupervised learning method learns without any the supervision and finds out a criterion. Alternatively, the model learner 2110-4 may train the learning network model through the reinforcement learning method using a feedback related to whether a result of learning is correct or not.

Furthermore, when a learning network model is trained, the model learner 2110-4 may store the trained learning network model. In this case, the model learner 2110-4 may store the trained learning network model in the storage 130 of the refrigerator 1. Alternatively, the model learner 2110-4 may store the trained learning network model in the memory of the first server SV1 or the memory of the second server SV2 connected to the refrigerator 1 via a wired or wireless network.

In this case, the storage 130 in which the trained learning network model is stored may also store instructions or data associated with, for example, at least one other element of the refrigerator 1. The memory may also store software and/or programs. For example, the program may include a kernel, a middleware, an application programming interface (API), and/or an application program (or "application").

The model evaluator 2110-5 may input evaluation data to the learning network model and, when a recognition result output from the evaluation data does not satisfy a predetermined criterion, the model evaluator 2110-5 may make the model learner 2110-4 to learn again. In this case, the evaluation data may be pre-set data for evaluating the learning network model.

For example, when the number or a ratio of evaluation data with incorrect recognition results from among recognition results of the trained learning network model with respect to evaluation data exceeds a predetermined threshold value, the model evaluator 2110-5 may evaluate that the predetermined criterion is not satisfied. For example, when the predetermined criterion is defined as a ratio of 2% and the trained learning network model outputs incorrect recognition results for evaluation data exceeding 20 out of a total of 1000 pieces of evaluation data, the model evaluator 2110-5 may evaluate that the trained learning network model is inappropriate.

On the other hand, when the plurality of trained learning network models is present, the model evaluator 2110-5 may evaluate whether each of the trained learning network models satisfies the predetermined criteria and may select a learning network model satisfying the predetermined criteria as a final learning network model. In this case, when the plurality of learning network models satisfying the predetermined criteria is present, the model evaluator 2110-5 may select one or a certain number of learning network model, as a final learning network model, and the one or certain number of learning network model may be pre-selected according to the evaluation score when the higher priority is given to the higher evaluation score.

At least one of the data acquirer 2110-1, the pre-processor 2110-2, the training data selector 2110-3, the model learner 2110-4, and the model evaluator 2110-5 in the data learner 2110 may be manufactured as at least one hardware chip and then mounted to an electronic device. For example, at least one of the data acquirer 2110-1, the pre-processor 2110-2, the training data selector 2110-3, the model learner 2110-4, and the model evaluator 2110-5 may be manufactured in the form of a dedicated hardware chip for artificial intelligence (AI) or manufactured as a part of a conventional general purpose processor (e.g., CPU or application processor) or a dedicated graphics processor (e.g., GPU) and then mounted to the above mentioned electronic device.

In this case, the data acquirer 2110-1, the pre-processor 2110-2, the training data selector 2110-3, the model learner 2110-4, and the model evaluator 2110-5 may be mounted on one electronic device or on separate electronic devices, respectively. For example, some of the data acquirer 2110-1, the pre-processor 2110-2, the training data selector 2110-3, the model learner 2110-4, and the model evaluator 2110-5 may be contained in the refrigerator 1 and the remaining some may be contained in the server SV1 or the server SV2.

At least one of the data acquirer 2110-1, the pre-processor 2110-2, the training data selector 2110-3, the model learner 2110-4, and the model evaluator 2110-5 may be implemented as a software module. When at least one of the data acquirer 2110-1, the pre-processor 2110-2, the training data selector 2110-3, the model learner 2110-4, and the model evaluator 2110-5 is implemented as a software module (or a program module including instructions), the software module may be stored in non-transitory computer readable media. In this case, at least one software module may be provided by Operating System (OS) or a certain application. Alternatively, some of the at least one software module may be provided by the OS and the remaining some may be provided by a certain application.

(b) of FIG. 21B is a block diagram of the data recognizer 2120 according to one embodiment of the present disclosure.

Referring to (b) of FIG. 21B, the data recognizer 2120 according to one embodiment may include a data acquirer 2120-1, a pre-processor 2120-2, a feature data selector 2120-3, a recognition result provider 2120-4, and a model updater 2120-5. Depending on some embodiments, the data recognizer 2120 according to one embodiment may necessarily include the data acquirer 2120-1 and the recognition result provider 2120-4, and selectively include at least one of the pre-processor 2120-2, the feature data selector 2120-3, and the model updater 2120-5.

The data recognizer 2120 may recognize the food name and the food mark corresponding to the speech data, or the user uttering the speech data, by applying the speech data as the feature data to the trained learning network model. Alternatively, the data recognizer 2120 may recognize the food stored in the storage compartment 20 of the refrigerator 1, by applying the image data as the feature data to the trained learning network model.

First, the data acquirer 2120-1 may acquire speech data needed for recognizing food name and the food mark and the user uttering the speech, from the speech data. Alternatively, the data acquirer 2120-1 may acquire image data for recognizing the food from the image data.

For example, the data acquirer 2120-1 may acquire data, which is directly input from the user or selected by the user, or may acquire a variety of sensing information detected by various sensors of the refrigerator 1. Alternatively, the data acquirer 2120-1 may acquire data from an external device (e.g., mobile terminal or a server) communicated with the refrigerator 1.

The pre-processor 2120-2 may pre-process the speech data or image data. The pre-processor 2120-2 may process the acquired speech data or image data into a predetermined format so that the recognition result provider 2120-4, which will be described later, may use the data acquired for training for the situation determination.

For example, the pre-processor 2120-2 may remove noises from data, such as the speech data or image data, acquired by the data acquirer 2120-1 so as to select effective data, or process the data into a certain format. Alternatively, the pre-processor 2120-2 may process the acquired data form into a form of data suitable for training.

The feature data selector 2120-3 may randomly select speech data or image data, which is needed for recognition, from the pre-processed data according to the pre-determined criteria, or the feature data selector 2120-3 may randomly select the speech data or the image data, from the pre-processed data. The selected feature data may be provided to the model leaner 2110-4. The pre-determined criteria may include at least one of an attribute of data, a generation time of data, a place where data is generated, an apparatus for generating data, a reliability of data, and a size of data.

The recognition result provider 2120-4 may recognize the selected feature data by applying the selected feature data to the learning network model. For example, the recognition result provider 2120-4 may recognize the food name or the identification mark corresponding to the speech by applying the selected speech data to the learning network mode. Alternatively, the recognition result provider 2120-4 may recognize the user uttering the speech by applying the selected speech data to the learning network model. Alternatively, the recognition result provider 2120-4 may recognize the food corresponding to the image data by applying the selected image data to the learning network model.

The model updater 2120-5 may allow the learning network model to be refined, based on the evaluation of the recognition result provided from the recognition result provider 2120-4. For example, the model updater 2120-5 may allow the model leaner 2110-4 to refine the learning network model, by providing the food name, the identification mark or the user information, which is provided from the recognition result provider 2120-4, to the model leaner 2110-4 again.

At least one of the data acquirer 2120-1, the pre-processor 2120-2, the feature data selector 2120-3, the recognition result provider 2120-4, and the model updater 2120-5 in the data recognizer 2120 may be manufactured as at least one hardware chip and then mounted to an electronic device. For example, at least one of the data acquirer 2120-1, the pre-processor 2120-2, the feature data selector 2120-3, the recognition result provider 2120-4, and the model updater 2120-5 may be manufactured in the form of a dedicated hardware chip for artificial intelligence (AI) or manufactured as a part of a conventional general purpose processor (e.g., CPU or application processor) or a dedicated graphics processor (e.g., GPU) and then mounted to the above mentioned electronic device.

In addition, the data acquirer 2120-1, the pre-processor 2120-2, the feature data selector 2120-3, the recognition result provider 2120-4, and the model updater 2120-5 may be mounted on one electronic device or on separate electronic devices, respectively. For example, some of the data acquirer 2120-1, the pre-processor 2120-2, the feature data selector 2120-3, the recognition result provider 2120-4, and the model updater 2120-5 may be contained in the refrigerator 1 and the remaining some may be contained in the server.

At least one of the data acquirer 2120-1, the pre-processor 2120-2, the feature data selector 2120-3, the recognition result provider 2120-4, and the model updater 2120-5 may be implemented as a software module. When at least one of the data acquirer 2120-1, the pre-processor 2120-2, the feature data selector 2120-3, the recognition result provider 2120-4, and the model updater 2120-5 is implemented as a software module (or a program module including instructions), the software module may be stored in non-transitory computer readable media. In this case, at least one software module may be provided by Operating System (OS) or a certain application. Alternatively, some of the at least one software module may be provided by the OS and the remaining some may be provided by a certain application.

Figure 22:
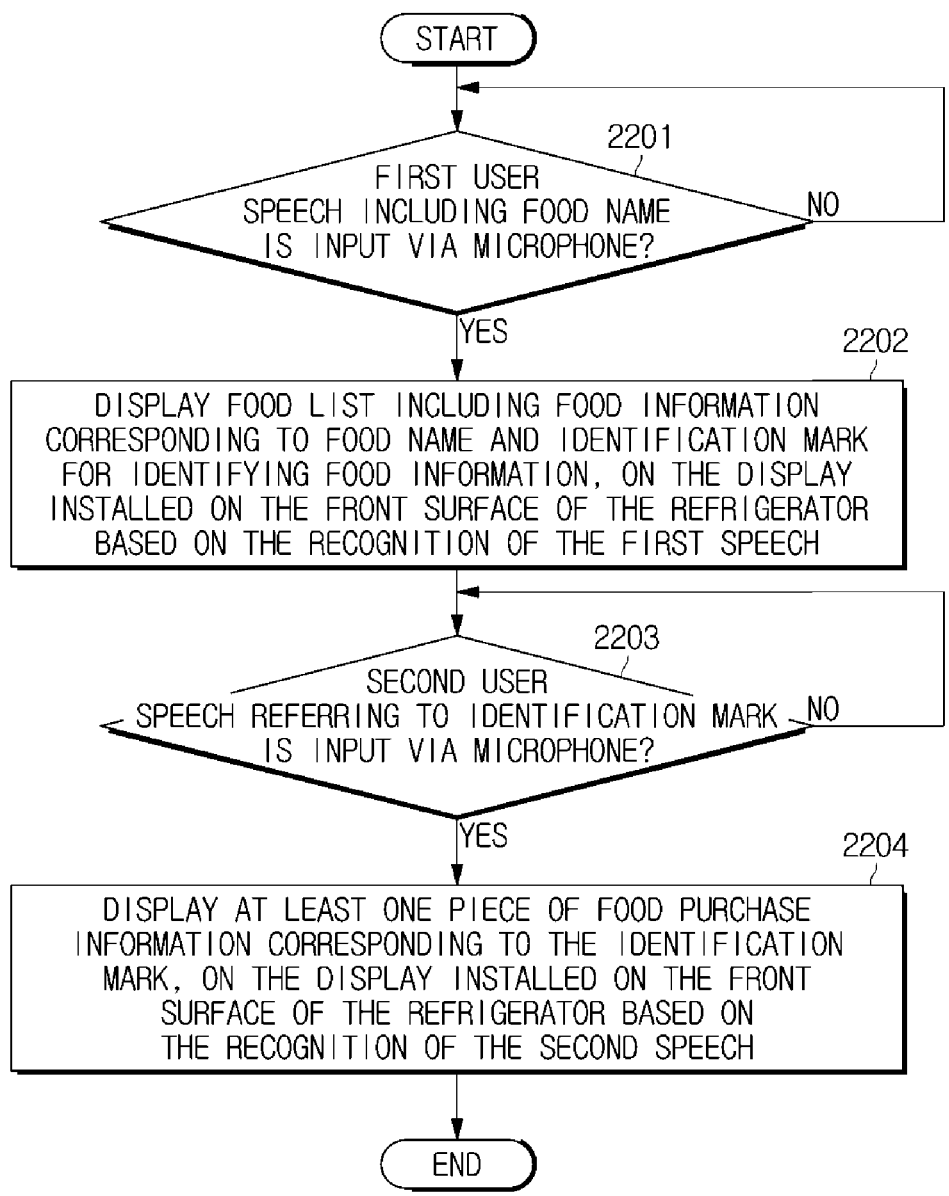
FIG. 22 is a flow chart of the refrigerator displaying information according to one embodiment of the present disclosure.

FIG. 22 is a flow chart of the refrigerator displaying information according to one embodiment of the present disclosure The refrigerator 1 may identify whether a first speech including a food name is input through the microphone 182 (2201).

When it is identified that the first speech is input based on the result of the identification, the refrigerator 1 may display a food list including food information corresponding to the food name and an identification mark for identifying food information, on the display 120 installed on the front surface of the refrigerator 1 based on the recognition of the first speech (2202).

For example, based on the first speech being identified, the refrigerator 1 may acquire the food name by recognizing the first speech using the learning network model, which is trained through the artificial intelligence algorithm, and display the food list including the food information corresponding to the food name, on the display 120. In this case, the learning network model may be a learning network model that is trained using a plurality of speeches and a plurality of words corresponding to the plurality of speeches.

As another example, based on the first speech being identified, the refrigerator 1 may acquire the food name and information on the user uttering the first speech by recognizing the first speech using the learning network model, which is trained through the artificial intelligence algorithm, and display the food list including the food information (e.g., information on a food preferred by the user) which corresponds to the food name and is related to the user information, on the display 120. In this case, the learning network model may be a learning network model that is trained using a plurality of speeches and the user information respectively corresponding to the plurality of speeches.

As yet another example, based on the first speech being identified, the refrigerator 1 may identify whether a food related to the recognized food name is placed in the storage compartment 20 of the refrigerator 1. When it is identified that the food is not placed in the storage compartment 20, the refrigerator 1 may display the food list including the food information corresponding to the food name, on the display 120. Meanwhile, when it is identified that the food is placed in the storage compartment 20, the refrigerator 1 may display information indicating that the food related to the recognized food name is placed in the storage compartment 30, on the display 120.

Next, the refrigerator 1 may identify whether a second speech indicating the identification mark is input via the microphone 182 (2203).

When it is identified that the second speech is input, based on the result of the identification, the refrigerator 1 may display at least one piece of purchase information of food corresponding to the identification mark, on the display 120 installed on the front surface of the refrigerator 1 based on the recognition of the second speech (2204).

For example, based on the second speech being identified, the refrigerator 1 may acquire the identification mark by recognizing the second speech using the learning network model, which is trained through the artificial intelligence algorithm, and display the food purchase information corresponding to the identification mark, on the display.

Figure 23:
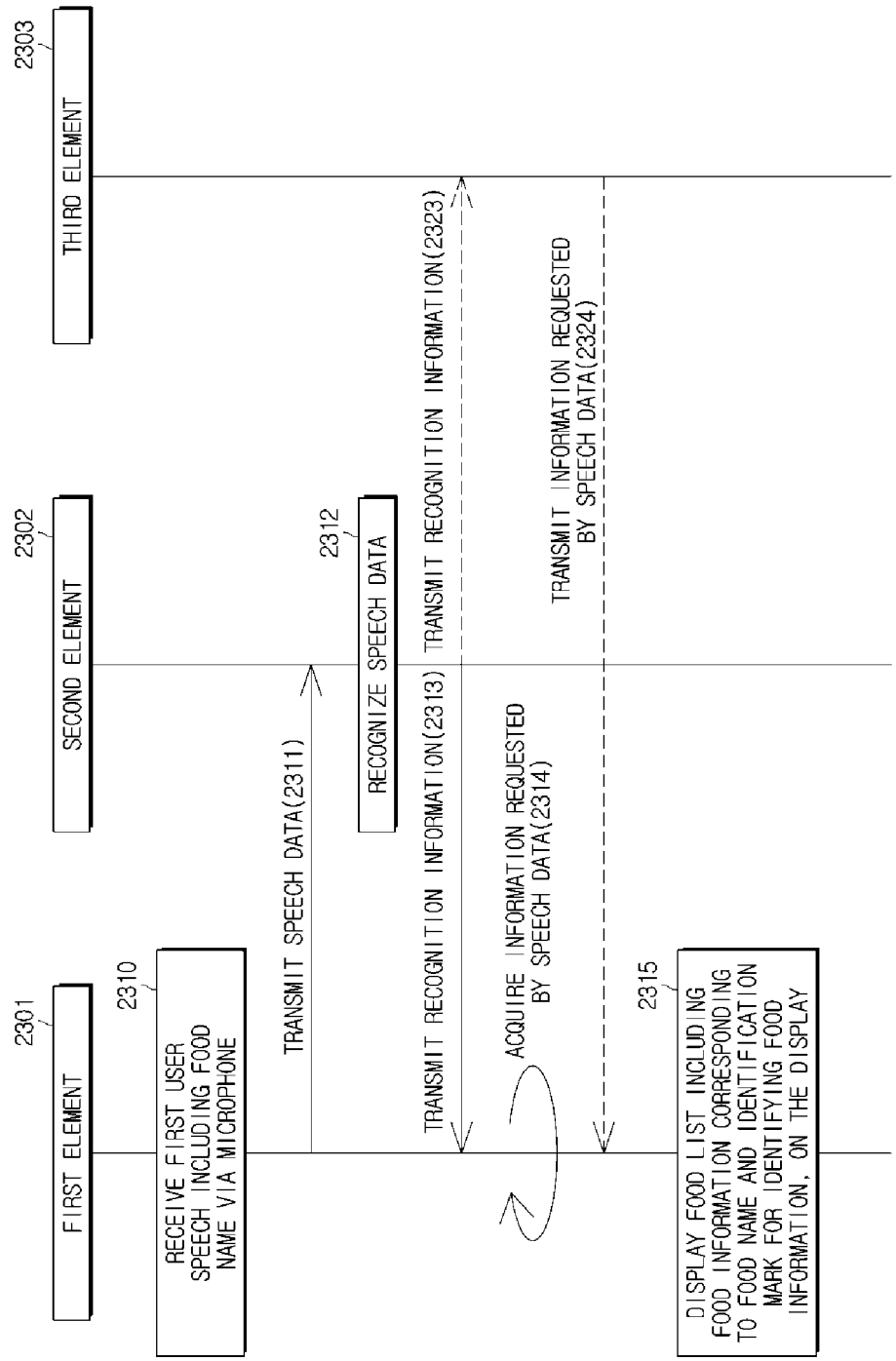
FIG. 23 is a flow chart of a network system according to one embodiment of the present disclosure.

FIG. 23 is a flow chart of a network system according to one embodiment of the present disclosure.

Referring to FIG. 23, a network system may include a first element 2301 and second element 2302. The first element 2301 may be the refrigerator 1, and the second element 2302 may be the server SV1 in which the data recognition model is stored, or a cloud computing including at least one server. Alternatively, the first element 2301 may be a general purpose processor and the second element 2302 may be an artificial intelligence dedicated processor. Alternatively, the first element 2301 may be at least one application, and the second element 2302 may be an operating system (OS). That is, the second element 2302 may be more integrated, more dedicated, and have smaller delay, greater performance, and more resources, in comparison with the first element 2301, and thus the second element 2302 may more quickly and effectively process operations, which are required at the time of generation, update, or application of the data recognition model, in comparison with the first element 2301.

Meanwhile, an interface for transmitting/receiving data between the first element 2301 and the second element 2302 may be defined.

For example, an API having feature data to be applied to a data recognition model as an parameter (or an intermediate value or a transfer value) may be defined. An API may be defined as a set of subroutines or functions that may be called by any one protocol (e.g., a protocol defined in the refrigerator 1) for a certain processing of another protocol (e.g., a protocol defined in the server SV1). In other words, an environment in which an operation of another protocol may be performed by any one protocol through an API may be provided.

Referring to FIG. 23, the first element 2301 may receive the user first speech including the food name through the microphone 182 (2310).

The first element 2301 may convert an input analog speech signal into speech data corresponding to a digital signal and transmit the digital signal to the second element 2302. At this time, the first element 2301 may change the speech data according to the defined communication format and transmit the changed speech data to the second element 2302 (2311).

The second element 2302 may recognize the received speech data (2312). For example, the second element 2302 may recognize speech data by applying the received speech data into the trained learning network model, and acquire recognition information based on the result of the recognition. For example, the second element 2302 may acquire the food name and information on the user uttering the speech, from the speech data. The second element 2302 may transmit the acquired recognition information to the first element 2301 (2313).

The first element 2301 may acquire information, which is requested by the speech data, based on the received recognition information (2314). For example, the first element 2301 may acquire food information corresponding to the food name, which corresponds to information requested by the speech data, from the storage of the first element 2301 or from a third element 2303. The third element 2303 may be a server communicated with the first element 2301. For example, the server may be the server SV2 configured to transmit information requested by the speech data in FIGS. 9 and 10.

In operation 2312, the second element 2302 may directly transmit the recognized recognition information to the third element 2303 without passing through the first element 2301 (2323). In this case, the third element 2303 may acquire information requested by the speech data, based on the received recognition data and transmit the acquired information, which is requested by the speech data, to the first element 2301 (2324). The first element 2301 may acquire information, which is requested by the speech data, from the third element 2303.

When the information, which is requested by the speech data, is acquired in operations 2314 and 2324, the first element 2301 may display a food list including food information corresponding to the food name and an identification mark for identifying the food information, which is requested by the speech data (2315).

Meanwhile, when the first element 2301 confirms the food list including the identification mark and a user second speech indicating one identification mark is recognized, the first element 2301 may display at least one piece of food purchase information corresponding to the identification mark.

Figure 24:
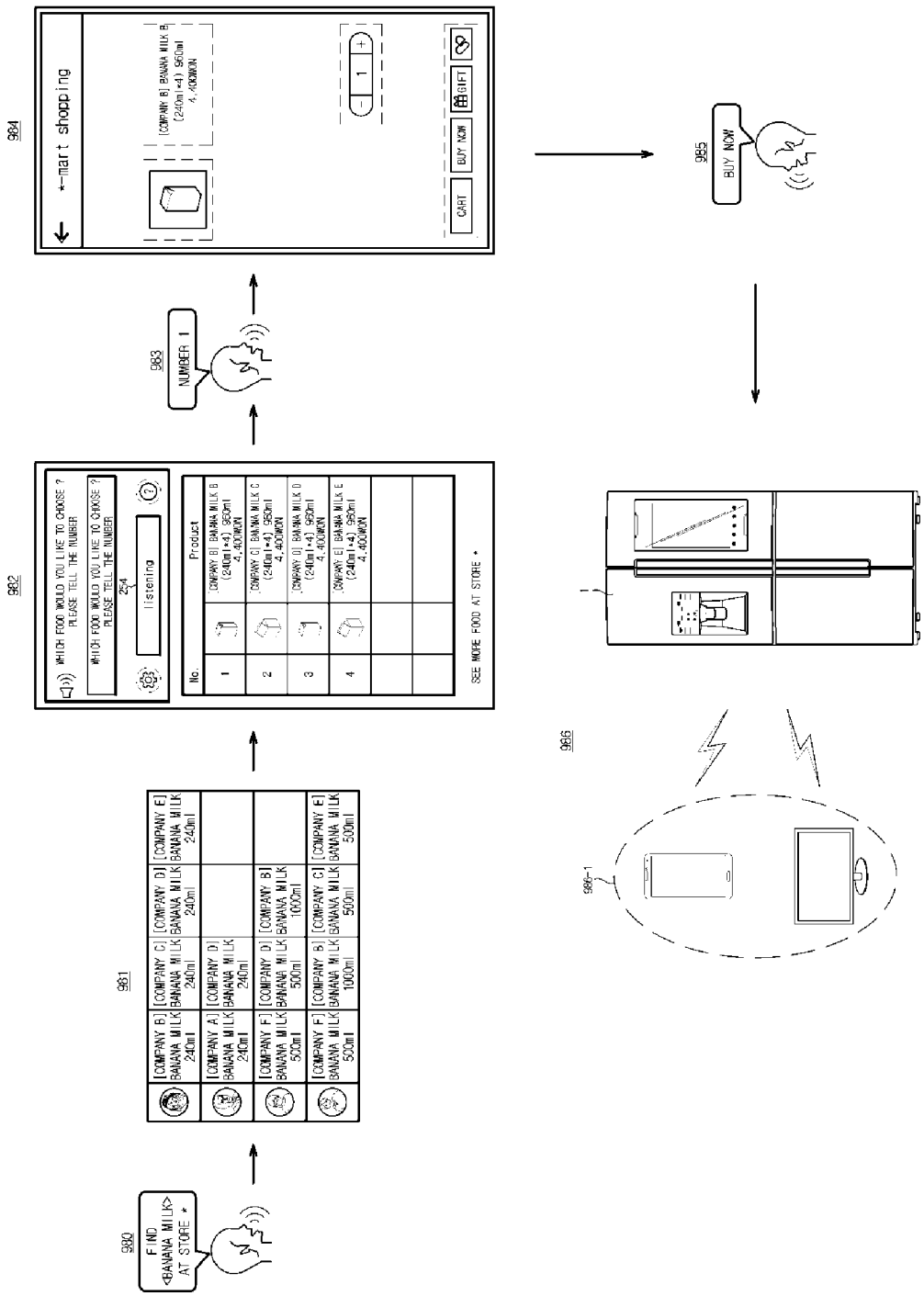
FIG. 24 is a view illustrating a method in which a user purchases food via a refrigerator according to another embodiment of the present disclosure.

FIG. 24 is a view illustrating a method in which a user purchases food via a refrigerator according to another embodiment of the present disclosure.

As illustrated in FIG. 24, a first speech for ordering a specific food may be input through a microphone 182 (980).

A controller 110 may recognize the first speech including the food name. As a recognition result, the controller 110 may acquire the recognized food name and information on the user uttering the first speech.

Based on the food name and the user information being acquired, the controller 110 may acquire food information, which is preferred by the user uttering the first speech, related to the food name (981).

Based on the acquired food information, the controller 110 may display a food list including information on a plurality of foods preferred by the user and identification marks for identifying the plurality of pieces of food information, on the display 120 (982).

Next, a second speech indicating a particular identification mark among the identification marks contained in the food list may be input via the microphone 182 (983).

The controller 110 may recognize the second speech including the identification mark. As a result of the recognition, the controller 110 may display the purchase information of the food corresponding to the identification mark, on the display 120 (984).

Next, a third speech requesting the food purchase may be input through the microphone 182 (985). The third speech requesting the food purchase may be a speech "buy now" uttered by the user.

The controller 110 may recognize the third speech. The controller 110 may display an UI (e.g., UI for payment) on the display 120 for purchasing food as a recognition result of the third speech. In this situation, the controller 110 may control the communication circuitry 140 so that a message indicating of purchase status is output to an external device 986-1 (986). The message indicating of purchase status may include a message for confirming whether to purchase a food before purchasing the food, a message for asking to input a password for purchasing the food, or a message indicating a result of purchasing after purchasing the food.

For example, the controller 110 may recognize at least one of the first speech and the third speech to acquire the information of the user uttering the speech. The controller 110 may transmit a message informing the purchase status to a user device corresponding to the user information, by using the acquired user information. When the food, which is asked by the user, is placed in the storage compartment 20 of the refrigerator 1, the controller 110 may transmit information indicating the information on the stored food, to the user device. In addition, the controller 110 may transmit the message to a device belonging to a guardian of the user uttering the speech. For example, when a person who ordered the food is a child, the controller 110 may send a message to a device belonging to the child's parent to notify the purchase status described above.

In response to the received message, the external device 986-1 receiving the message may indicate the purchase status in a text, a speech, an image, a haptic manner or by emitting light, but is not limited thereto.

According to some embodiments, when the purchase of the food occurs via the refrigerator 1, the controller 110 may transmit a message indicating the purchase status to a device, which is pre-selected, or the external device 986-1 communicated with the refrigerator 1. Alternatively, the controller 110 may transmit a message informing the purchase status to the external device 986-1 satisfying the predetermined criteria. At this time, the external device 986-1 satisfying the predetermined criteria may be an external device which is placed a certain place (e.g., a living room, or a main room), an external device having a signal, which is for communicating with the refrigerator 1 and has a certain intensity or more and, an external device placed in a certain distance from the refrigerator 1. In addition, the predetermined criteria may be the external device 981-1 communicated with the refrigerator 1 according to a certain communication method. For example, the certain communication method may include the local area communication system (e.g., WiFi, Bluetooth, or Zigbee) or the direct communication method. When the refrigerator 1 is communicated with the external device 986-1 according to the local area communication method, the controller 110 may transmit a push message informing the purchase status to the external device 986-1 via a communication channel established according to the local area communication method.

The term "module" used for the present disclosure, for example, may mean a unit including one of hardware, software, and firmware or a combination of two or more thereof. A "module," for example, may be interchangeably used with terminologies such as a unit, logic, a logical block, a component, a circuit, etc. The "module" may be a minimum unit of a component integrally configured or a part thereof. The "module" may be a minimum unit performing one or more functions or a portion thereof. The "module" may be implemented mechanically or electronically. For example, the "module" according to the present disclosure may include at least one of an application-specific integrated circuit (ASIC) chip performing certain operations, a field-programmable gate arrays (FPGAs), or a programmable-logic device, known or to be developed in the future.

The above-mentioned embodiments may be implemented in the form of a program instruction executed by a variety of computer means and stored in computer-readable storage medium. The computer-readable storage medium may include program instructions, data files, and data structures as itself or a combination therewith. In addition, the program instruction may be particularly designed to implement the present disclosure or may be implemented by using various functions or definition that are well-known and available to a group of ordinary skill in the computer software field. The computer-readable storage medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

Also, a method according to the disclosed embodiments may be provided in a computer program product.

A computer program product may include software program, computer-readable storage medium in which S/W program is stored, or applications traded between a seller and a purchaser.

For example, a computer program product may include an application in the form of a software program (e.g., a downloadable application) that is electronically distributed by the refrigerator 1, the server SV1, or the server SV2 or a manufacturer of the devices or through an electronic marketplace (e.g., Google Play Store, App Store, etc.). For electronic distribution, at least a portion of a software program may be stored on a storage medium or may be generated temporarily. In this case, the storage medium may be a server of a manufacturer, a server of an electronic marketplace, or a storage medium of a relay server for temporarily storing the software program.

While the present disclosure has been particularly described with reference to exemplary embodiments, it should be understood by those of skilled in the art that various changes in form and details may be made without departing from the spirit and scope of the present disclosure.

The invention claimed is:

1. A refrigerator comprising:
a storage compartment configured to store food;
a temperature detector configured to detect an internal temperature of the storage compartment;
a cooler configured to supply cool air to the storage compartment;
a microphone configured to receive a speech;
a display configured to display information;
at least one processor configured to be electrically connected to the temperature detector, the microphone, and the display; and
a memory configured to be electrically connected to the at least one processor,
wherein the memory is configured to store at least one instruction that when executed causes the at least one processor to:
when a first speech comprising a food name is received via the microphone, identify whether a food related to the food name is placed in the storage compartment,
when the food is placed in the storage compartment, display, on the display, information indicating that the food of the first speech received via the microphone is placed in the storage compartment,
when the food is not placed in the storage compartment, receive a second speech referring to an identification mark via the microphone and display, on the display a food list that comprises food information corresponding to the food of the first speech received via the microphone and the identification mark identifying the food information, and
when the second speech referring to the identification mark is received via the microphone, display, on the display, food purchase information corresponding to the identification mark.

2. The refrigerator of claim 1, wherein:
the memory is further configured to store at least one instruction that when executed cause the at least one processor to:
when the first speech comprising the food name is received via the microphone, acquire the food name by recognizing the first speech using a learning network model, which is trained using an artificial intelligence algorithm, and display, on the display, the food list comprising the food information corresponding to the food name, and
the learning network model is trained by using a plurality of speeches and a plurality of words corresponding to the plurality of speeches.

3. The refrigerator of claim 1, wherein:
the memory is configured to store at least one instruction that when executed causes the at least one processor to:
when the first speech comprising the food name is received via the microphone, acquire the food name and user information of a user uttering the first speech by recognizing the first speech using a learning network model, which is trained using an artificial intelligence algorithm, and
display, on the display, the food list comprising the food information, which corresponds to the food name and is related to the user information, and
the learning network model is trained by using a plurality of speeches and a plurality of pieces of user information corresponding to the plurality of speeches.

4. The refrigerator of claim 1, wherein the memory is configured to store at least one instruction that when executed causes the at least one processor to, when the first speech is recognized, overlap the food list in a second user interface with a first user interface of an application displayed on the display.

5. The refrigerator of claim 1, wherein the memory is configured to store at least one instruction that when executed causes the at least one processor to, when the second speech is recognized, execute an application providing information of food indicated by a mark contained in the second speech so as to display food purchase information, which is provided from the application, on the display.

6. The refrigerator of claim 1, further comprising:
a communication circuitry,
wherein the memory is configured to store at least one instruction that when executed causes the at least one processor to:
when at least one speech of the first speech and the second speech is received, transmit data of the at least one speech to a server via the communication circuitry, and
when the communication circuitry receives at least one information of information on the food list and food purchase information transmitted from the server, display at least one information transmitted from the server on the display.

7. The refrigerator of claim 1, further comprising:
a communication circuitry,
wherein the memory is configured to store at least one instruction that when executed causes the at least one processor to:
when at least one speech of the first speech and the second speech is received, transmit data of the at least one speech to a server via the communication circuitry, and
when the communication circuitry receives analysis information on the at least one speech transmitted from the server, transmit a command according to the analysis information to an application, which is related to performance of an operation according to the analysis information so as to allow the application to display at least one of the food list and the food purchase information.

8. The refrigerator of claim 1, further comprising:
a speaker,
wherein the memory is configured to store at least one instruction that when executed causes the at least one processor to:
when the food list is displayed on the display due to recognition of the first speech, output, via the speaker, a speech indicating that the food list is displayed, and
when the food purchase information is displayed on the display due to the recognition of the second speech, output, via a speaker, a speech indicating that the food purchase information is displayed.

* * * * *